(12) United States Patent         (10) Patent No.:    US 11,368,990 B2
     Li et al.                    (45) Date of Patent:    Jun. 21, 2022

(54) DATA TRANSMISSION METHOD AND DEVICE FOR DETERMINING A RADIO BEARER FOR HANDOVER

(71) Applicant: HUAWEI TECHNOLOGIES CO., LTD., Guangdong (CN)

(72) Inventors: Yongcui Li, Beijing (CN); Yan Li, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 80 days.

(21) Appl. No.: 16/540,855

(22) Filed: Aug. 14, 2019

(65) Prior Publication Data
     US 2019/0373651 A1    Dec. 5, 2019

Related U.S. Application Data

(63) Continuation of application No. PCT/CN2017/073679, filed on Feb. 15, 2017.

(51) Int. Cl.
    *H04W 76/12*    (2018.01)
    *H04W 76/11*    (2018.01)
    (Continued)

(52) U.S. Cl.
    CPC .......... *H04W 76/12* (2018.02); *H04W 36/08* (2013.01); *H04W 76/11* (2018.02); *H04W 80/08* (2013.01)

(58) Field of Classification Search
    CPC ..... H04W 76/12; H04W 76/11; H04W 36/08; H04W 80/08; H04W 36/0033; H04W 36/02
    See application file for complete search history.

(56) References Cited

U.S. PATENT DOCUMENTS

2008/0051084 A1    2/2008  Casati et al.
2010/0067489 A1    3/2010  Pelletier et al.
                   (Continued)

FOREIGN PATENT DOCUMENTS

CN    101365168 A    2/2009
CN    101436984 A    5/2009
                (Continued)

OTHER PUBLICATIONS

3GPP TS 23.401 V14.2.0 (Dec. 2016),3rd Generation Partnership Project;Technical Specification Group Services and System Aspects;General Packet Radio Service (GPRS) enhancements for Evolved Universal Terrestrial Radio Access Network (E-UTRAN) access(Release 14),total 385 pages.
(Continued)

*Primary Examiner* — Peter P Chau
(74) *Attorney, Agent, or Firm* — Womble Bond Dickinson (US) LLP

(57) ABSTRACT

This application provides a data transmission method and device. In a process in which a terminal device is handed over from a source access network device to a target access network device, the source access network device processes buffered packet data convergence protocol (PDCP) data, so that when a forwarding tunnel is a tunnel of a session granularity or a group granularity, the target access network device accurately forwards data in the handover process. The method includes: encapsulating, by a source access network device, indication information in an encapsulation header of PDCP data, where the indication information is used to indicate a radio bearer used for sending the PDCP data by a target access network device; and sending, by the source access network device to the target access network device, the PDCP data in which the indication information is encapsulated.

20 Claims, 8 Drawing Sheets

(51) Int. Cl.
*H04W 36/08* (2009.01)
*H04W 80/08* (2009.01)

(56) References Cited

U.S. PATENT DOCUMENTS

| | | | | |
|---|---|---|---|---|
| 2010/0260126 | A1* | 10/2010 | Ulupinar | H04W 92/20 370/329 |
| 2012/0020278 | A1* | 1/2012 | Moberg | H04B 7/155 370/315 |
| 2014/0206361 | A1* | 7/2014 | Centonza | H04W 36/0072 455/444 |
| 2017/0245184 | A1* | 8/2017 | Nagesh Shetigar | H04W 36/023 |
| 2017/0280345 | A1 | 9/2017 | Tian | |
| 2018/0167854 | A1* | 6/2018 | Enomoto | H04W 36/0033 |
| 2019/0261240 | A1* | 8/2019 | Fang | H04W 28/0268 |
| 2019/0320476 | A1* | 10/2019 | Wang | H04W 28/0268 |

FOREIGN PATENT DOCUMENTS

| | | |
|---|---|---|
| CN | 102006640 A | 4/2011 |
| CN | 102026398 A | 4/2011 |
| CN | 102791008 A | 11/2012 |
| CN | 102958122 A | 3/2013 |
| CN | 105471763 A | 4/2016 |
| EP | 2123085 A2 | 11/2009 |
| WO | 2016090124 A1 | 6/2016 |

OTHER PUBLICATIONS

3GPP TR 23.799 V14.0.0 (Dec. 2016),3rd Generation Partnership Project;Technical Specification Group Services and System Aspects;Study on Architecture for Next Generation System(Release 14),total 522 pages.

3GPP TS 36.331 V14.1.0 (Dec. 2016),3rd Generation Partnership Project;Technical Specification Group Radio Access Network,Evolved Universal Terrestrial Radio Access (E-UTRA);Radio Resource Control (RRC);Protocol specification Release 14),dated Dec. 2016,total 654 pages.

3rd Generation Partnership Project; Technical Specification Group Radio Access Network; Evolved Universal Terrestrial Radio Access (E-UTRA) and Evolved Universal Terrestrial Radio Access Network (E-UTRAN);Overall description;Stage 2 (Release 14), 3GPP TS 36.300, vol. RAN WG2, No. V14.1.0, Dec. 30, 2016, 318 pages.

ZTE CORPORATION:"Discussion on data forwarding in mobility enhancement solutions", 3GPP Draf I; R3-161144, vol. Ran WG3, No. Nanjing, China; 20160523—20160527, May 22, 2016, 6 pages.

* cited by examiner

DATA TRANSMISSION METHOD AND DEVICE FOR DETERMINING A RADIO BEARER FOR HANDOVER

CROSS-REFERENCE TO RELATED APPLICATIONS

This application is a continuation of International Patent Application No. PCT/CN2017/073679, filed on Feb. 15, 2017, the disclosure of which is hereby incorporated by reference in its entirety.

TECHNICAL FIELD

This application relates to the communications field, and more specifically, to a data transmission method and device.

BACKGROUND

As high-frequency spectrums are continuously used, communication cells become smaller, and emergence of hotpot cells increases handover frequency of the communication cells. Before user equipment (UE) is handed over, the user equipment first receives some packet data convergence protocol service data units (PDCP SDU) from a source base station, and after the handover, the user equipment starts to receive, from a target base station, PDCP SDUs (in which some PDCP SDUs have been forwarded by the source base station to the target base station, and some PDCP SDUs have been sent by the source base station to a terminal but have not been acknowledged). Data communication between the source base station and the target base station is implemented through a direct forwarding tunnel or an indirect forwarding tunnel. However, in future 5th generation (5G) communication, the indirect forwarding tunnel or the direct forwarding tunnel has a granularity of per session or per group, and in this case, the target base station cannot send a packet data convergence protocol (PDCP) packet to the user equipment by using a correct radio bearer.

Therefore, during cell handover, especially when the indirect forwarding tunnel or the direct forwarding tunnel is a tunnel of a session granularity or a group granularity, how a target access network device (e.g. a base station) sends PDCP data to user equipment by using a correct radio bearer to increase a data transmission rate is an urgent problem to be resolved.

SUMMARY

Embodiments of this application provide a data transmission method and device, and when a terminal device is handed over from a source access network device to a target access network device, the target access network device can accurately determine a radio bearer for sending PDCP data, thereby increasing a data transmission rate.

According to a first aspect, an embodiment of this application provides a data transmission method, including: encapsulating, by a source access network device, indication information in an encapsulation header of packet data convergence protocol (PDCP) data, where the indication information is used to indicate a radio bearer used for sending the PDCP data by a target access network device; and sending, by the source access network device to the target access network device, the PDCP data in which the indication information is encapsulated.

In this embodiment of this application, in a process in which a terminal device is handed over from the source access network device to the target access network device, the source access network device processes buffered PDCP data, and adds indication information to an encapsulation header of the PDCP data, where the indication information is used to instruct the target access network device to send the PDCP data to a corresponding radio bearer, so that a packet is sent to the correct radio bearer, thereby resolving a problem that data in the handover process cannot be accurately forwarded when a forwarding tunnel is a tunnel of a session granularity or a group granularity.

Optionally, in an implementation of the first aspect, the indication information includes: a first radio bearer identifier, a quality of service marking, a quality of service marking and an Internet protocol (IP) address of the terminal device, a second radio bearer identifier, or a third radio bearer identifier, where the first radio bearer identifier is allocated by a control plane network element and used to identify a radio bearer between an access network and the terminal device; the quality of service marking is information in an encapsulation header of a packet transmitted between a core network user plane network element and a source access network, and is used to identify a quality of service requirement of data transmission; the second radio bearer identifier is allocated by the target access network, and is used to identify a radio bearer between the target access network device and the terminal device; and the third radio bearer identifier is allocated by the source access network device, and is used to identify a radio bearer between the source access network device and the terminal device.

In this embodiment of this application, the indication information may be the first radio bearer identifier, the quality of service marking, the quality of service marking and the IP address of the terminal device, the second radio bearer identifier, or the third radio bearer identifier. The source access network device encapsulates the indication information in the encapsulation header of the PDCP data, and sends the PDCP data to the target access network device, so that the target access network device sends the PDCP data to the corresponding radio bearer based on the indication information encapsulated in the encapsulation header of the PDCP data.

Optionally, in an implementation of the first aspect, the sending, by the source access network device to the target access network device, the PDCP data in which the indication information is encapsulated includes:

sending, by the source access network device to the target access network device through a forwarding tunnel, the PDCP data in which the indication information is encapsulated, where the forwarding tunnel is used to transmit one or more service packets of the terminal device; and the encapsulating, by a source access network device, indication information in an encapsulation header of PDCP data includes: when the forwarding tunnel is a tunnel of a session granularity, encapsulating at least one of the first radio bearer identifier, the quality of service marking, the second radio bearer identifier, and the third radio bearer identifier in the encapsulation header of the PDCP data; or when the forwarding tunnel is a tunnel of a group granularity, encapsulating at least one of the first radio bearer identifier, the second radio bearer identifier, the third radio bearer identifier, and the quality of service marking and the IP address of the terminal device in the encapsulation header of the PDCP data.

Optionally, in an implementation of the first aspect, before the sending, by the source access network device to the target access network device, the PDCP data in which the indication information is encapsulated, the method further includes:

receiving, by the source access network device, a handover request acknowledgment message from the target access network device; and determining, by the source access network device after receiving the handover request acknowledgment message, that the second radio bearer identifier is the indication information.

Optionally, in an implementation of the first aspect, the handover request acknowledgment message includes: the second radio bearer identifier, a correspondence between the second radio bearer identifier and the third radio bearer identifier, or a correspondence between the second radio bearer identifier and the quality of service marking.

Optionally, in an implementation of the first aspect, the determining, by the source access network device, that the second radio bearer identifier is the indication information includes:

determining that the second radio bearer identifier is the indication information based on the correspondence between the second radio bearer identifier and the third radio bearer identifier, or the correspondence between the second radio bearer identifier and the quality of service marking.

Optionally, in an implementation of the first aspect, determining, by the source access network device, the indication information based on the handover request acknowledgment message includes:

when the handover request acknowledgment message includes none of the information: the second radio bearer identifier, the correspondence between the second radio bearer identifier and the third radio bearer identifier, and the correspondence between the second radio bearer identifier and the quality of service marking, determining that the indication information is the third radio bearer identifier.

Optionally, in an implementation of the first aspect, before the sending, by the source access network device to the target access network device, the PDCP data in which the indication information is encapsulated, the method further includes:

determining, by the source access network device, the radio bearer for sending the PDCP data;

determining, based on a correspondence between the radio bearer and the first radio bearer identifier, that the indication information is the first radio bearer identifier;

determining, by the source access network device, the quality of service marking for sending the PDCP data, and determining that the indication information is the quality of service marking;

determining, by the source access network device, the quality of service marking and the IP address of the terminal device that are for sending the PDCP data, and determining that the indication information is the quality of service marking and the IP address of the terminal device;

or determining, by the source access network device, the radio bearer for sending the PDCP data, and determining, based on a correspondence between the radio bearer and the third radio bearer identifier, that the indication information is the third radio bearer identifier.

Optionally, in an implementation of the first aspect, the encapsulating, by a source access network device, indication information in an encapsulation header of PDCP data includes:

encapsulating the indication information in a transport layer protocol encapsulation header of the PDCP data; or encapsulating the indication information in a data link layer protocol encapsulation header of the PDCP data.

Optionally, in an implementation of the first aspect, the sending, by the source access network device to the target access network device, the PDCP data in which the indication information is encapsulated includes:

sending, by the source access network device to the target access network device by using the core network user plane network element, the PDCP data in which the indication information is encapsulated.

According to a second aspect, an embodiment of this application provides a data transmission method, including:

receiving, by a target access network device, packet data convergence protocol (PDCP) data from a source access network device, where an encapsulation header of the PDCP data includes indication information, and the indication information is used to indicate a radio bearer used for sending the PDCP data by the target access network device; and sending, by the target access network device, the PDCP data to a terminal device on the radio bearer based on the indication information.

In this embodiment of this application, in a process in which the terminal device is handed over from the source access network device to the target access network device, the target access network device receives PDCP data processed by the source access network device, and adds indication information to an encapsulation header of the PDCP data, where the indication information is used to instruct the target access network device to send the PDCP data to a corresponding radio bearer, so that the target access network device sends a packet to the correct radio bearer, thereby resolving a problem that data in the handover process cannot be accurately forwarded when a forwarding tunnel is a tunnel of a session granularity or a group granularity.

Optionally, in an implementation of the second aspect, the indication information includes: a first radio bearer identifier, a quality of service marking, a quality of service marking and an Internet protocol IP address of the terminal device, a second radio bearer identifier, or a third radio bearer identifier, where the first radio bearer identifier is allocated by a control plane network element, and is used to identify a radio bearer between an access network and the terminal device; the quality of service marking is information in an encapsulation header of a packet transmitted between a core network user plane network element and a source access network, and is used to identify a quality of service requirement of data transmission; the second radio bearer identifier is allocated by the target access network device, and is used to identify a radio bearer between the target access network device and the terminal device; and the third radio bearer identifier is allocated by the source access network device, and is used to identify a radio bearer between the source access network device and the terminal device.

In this embodiment of this application, the indication information may be the first radio bearer identifier, the quality of service marking, the quality of service marking and the IP address of the terminal device, the second radio bearer identifier, or the third radio bearer identifier. The source access network device encapsulates the indication information in the encapsulation header of the PDCP data, and sends the PDCP data to the target access network device, so that the target access network device sends the PDCP data to the corresponding radio bearer based on the indication information encapsulated in the encapsulation header of the PDCP data.

Optionally, in an implementation of the second aspect, when the indication information includes the first radio bearer identifier, it is determined that a radio bearer identified by the first radio bearer identifier is the radio bearer used for sending the PDCP data;

when the indication information includes the quality of service marking, it is determined that a radio bearer corresponding to the quality of service marking is the radio bearer used for sending the PDCP data;

when the indication information includes the quality of service marking and the IP address of the terminal device, it is determined that a radio bearer corresponding to the quality of service marking and the IP address of the terminal device is the radio bearer used for sending the PDCP data;

when the indication information includes the second radio bearer identifier, it is determined that a radio bearer identified by the second radio bearer identifier is the radio bearer used for sending the PDCP data; or when the indication information includes the third radio bearer identifier, the second radio bearer identifier corresponding to the third radio bearer identifier is determined, and it is determined that a radio bearer identified by the second radio bearer identifier is the radio bearer used for sending the PDCP data.

Optionally, in an implementation of the second aspect, when the indication information includes the third radio bearer identifier, the method further includes: storing, by the target access network device, a correspondence between the second radio bearer identifier and the third radio bearer identifier.

Optionally, in an implementation of the second aspect, receiving, by a target access network device, PDCP data from a source access network device includes:

receiving, by the target access network device through a forwarding tunnel, the PDCP data sent by the source access network device, where the forwarding tunnel is used to transmit one or more service packets of the terminal device, where when the forwarding tunnel is a tunnel of a session granularity, the indication information includes: the first radio bearer identifier, the quality of service marking, the second radio bearer identifier, or the third radio bearer identifier; or when the forwarding tunnel is a tunnel of a group granularity, the indication information includes: the first radio bearer identifier, the second radio bearer identifier, the third radio bearer identifier; or the quality of service marking and the IP address of the terminal device.

Optionally, in an implementation of the second aspect, before the receiving, by a target access network device, PDCP data from a source access network device, the method further includes:

sending, by the target access network device, a handover request acknowledgment message to the source access network device, where the handover request acknowledgment message includes: the second radio bearer identifier, the correspondence between the second radio bearer identifier and the third radio bearer identifier, or a correspondence between the second radio bearer identifier and the quality of service marking.

Optionally, in an implementation of the second aspect, the encapsulating indication information in an encapsulation header of PDCP data includes:

encapsulating the indication information in a transport layer protocol encapsulation header of the PDCP data; or encapsulating the indication information in a data link layer protocol encapsulation header of the PDCP data.

Optionally, in an implementation of the second aspect, the receiving, by a target access network device, PDCP data from a source access network device includes: receiving, by the target access network device, the PDCP data from the source access network device by using the core network user plane network element.

According to a third aspect, an embodiment of this application provides a data transmission device, which may include modules or units for performing the method according to any one of the first aspect or the optional implementations of the first aspect.

According to a fourth aspect, an embodiment of this application provides a data transmission device, which may include modules or units for performing the method according to any one of the second aspect or the optional implementations of the second aspect.

According to a fifth aspect, a wireless communication device is provided, and the device includes a memory, a transceiver, and a processor. The memory stores program code that can be used to instruct to perform any one of the first aspect or the optional implementations of the first aspect. The transceiver is configured to perform specific signal sending and receiving when driven by the processor. When the code is executed, the processor may implement the various operations performed by the source access network device in the foregoing method.

According to a sixth aspect, a wireless communication device is provided, and the device includes a memory, a transceiver, and a processor. The memory stores program code that can be used to instruct to perform any one of the second aspect or the optional implementations of the second aspect. The transceiver is configured to perform specific signal sending and receiving when driven by the processor. When the code is executed, the processor may implement the various operations performed by the target access network device in the foregoing method.

According to a seventh aspect, a computer program product including an instruction is provided. When the computer program product is run on a computer, the computer is enabled to perform the method in the foregoing aspects.

DESCRIPTION OF EMBODIMENTS

The following describes technical solutions in embodiments of this application with reference to accompanying drawings.

Figure 1:
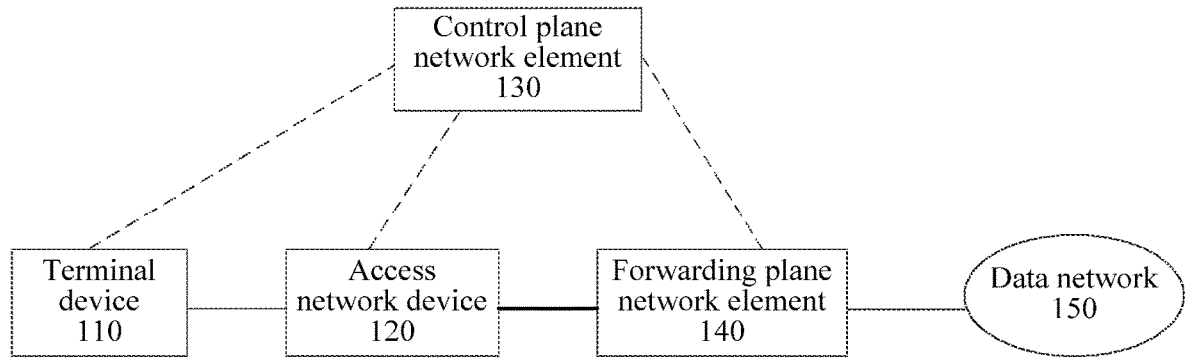
FIG. 1 is a schematic diagram of a communications system using a data transmission method according to an embodiment of this application.

FIG. 1 is a schematic diagram of a communications system 100 using a data transmission method according to this application. As shown in FIG. 1, the communications system 100 includes a terminal device 110, an access network device 120, a control plane network element 130, a forwarding plane network element 140, and a data network 150. In addition, a person of ordinary skill in the art may understand that, the different devices in the communications system 100 may communicate by using an interface.

The terminal device 110 may establish a user plane connection to the access network device 120 by using a bearer, or establish a communication signaling connection to the control plane network element 130 by using an interface. Optionally, in the embodiments of this application, the terminal device 110 includes but is not limited to an access terminal, user equipment (UE), a subscriber unit, a subscriber station, a mobile station, a mobile console, a remote station, a remote terminal, a mobile terminal, a user terminal, a terminal, a wireless communications device, a user agent, or a user apparatus. The access terminal may be a cellular phone, a cordless phone, a session initiation protocol (SIP) phone, a wireless local loop (WLL) station, a personal digital assistant (PDA), a handheld device having a wireless communication function, a computing device or another processing device connected to a wireless modem, an in-vehicle device, a wearable device, a terminal device in Internet of Things (IoT), a virtual reality device, a terminal device in a future 5G network or a terminal device in an evolved public land mobile network (PLMN), or the like.

The access network device 120 may be a device communicating with the terminal device 110, for example, a base station or a base station controller. However, it may be understood that, the access network device 120 may communicate with any quantity of terminal devices similar to the terminal device 110. The access network device 120 may further communicate with the control plane network element 130 by using an interface. Similarly, the access network device 120 may further communicate with the forwarding plane network element 140 by using an interface. Each access network device may provide communication coverage for a particular geographical area, and may communicate with a terminal device (for example, UE) located within the coverage (a cell). The access network device may support communication protocols in different standards, or may support different communication modes. Optionally, the access network device 120 may provide a wireless access service for the terminal device. For example, the access network device 120 may be an evolved NodeB (eNodeB), a wireless fidelity access point (WiFi AP), a worldwide interoperability for microwave access base station (WiMAX BS), or a wireless controller in a cloud radio access network (CRAN), or the access network device 120 may be a network device in a future 5G network or a network device in a future evolved public land mobile network (PLMN).

Figure 2:
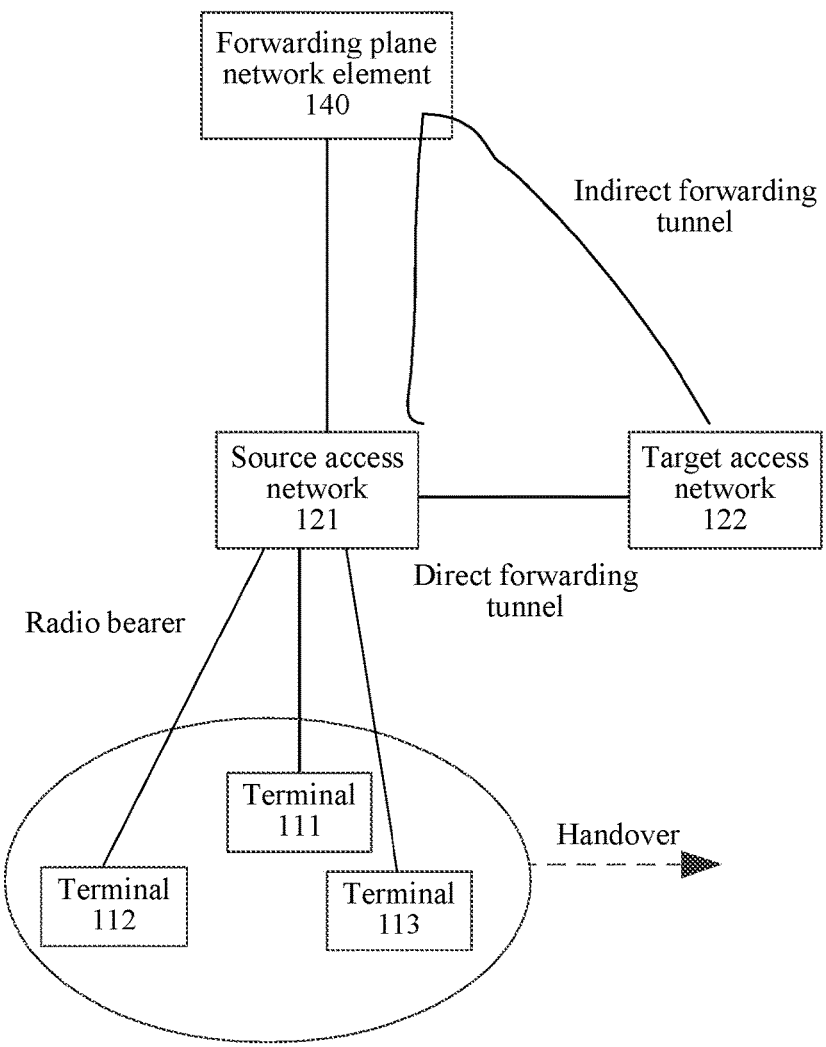
FIG. 2 is a schematic diagram of handover between access networks using a data transmission method according to an embodiment of this application.

Optionally, as shown in FIG. 2, the access network devices 120 (a source access network 121 and a target access network 122) may communicate with each other. For example, when performing access network handover, a terminal device 111, a terminal device 112, or a terminal device 113 needs to transmit data buffered in the source access network 121 to the target access network 122.

For example, as shown in FIG. 2, the source access network 121 may communicate with the target access network 122 through a direct forwarding tunnel.

For another example, as shown in FIG. 2, the source access network 121 may further communicate with the target access network 122 through an indirect forwarding tunnel, to complete data forwarding. The indirect forwarding tunnel is set up based on the forwarding plane network element 140. The source access network first transmits data to the forwarding plane network element 140, and then, the forwarding plane network element 140 forwards the data to the target access network device.

Optionally, as shown in FIG. 2, the forwarding tunnel between the source access network 121 and the target access network 122 may be a tunnel of a session granularity, or a tunnel of a group granularity.

Optionally, as shown in FIG. 2, the data transmitted between the source access network 121 and the target access network 122 may be packet data convergence protocol (Packet Data Convergence Protocol, PDCP) data or some other data, for example, IP data. These data is transmitted in a packet transport format of the tunnel between the source access network and the target access network.

The control plane network element 130 is responsible for mobility management and forwarding path management in the communications system 100, for example, delivering a packet forwarding policy to the forwarding plane network element 140, and instructing a gateway forwarding plane (GW-U) to process a packet and forward the packet based on the packet forwarding policy. The control plane network element 130 may be a software-defined network (SDN) controller, a gateway control plane (GW-C), a mobility management entity (MME), or all or a part of control functions obtained by merging the foregoing network elements. The software-defined network technology provides an effective approach to a bottleneck problem of gateway signaling processing. A control plane interface signaling processing function of a gateway is further separated from a user plane data forwarding function. The interface signaling processing function is deployed on a computing platform and used as a control plane network element (CP), and the user plane data forwarding function is deployed on a special-purpose hardware platform and used as a forwarding plane network element (UP). The control plane network element 130 may further be divided into a mobility management network element and a session management network element. The mobility management network element is responsible for mobility management of a terminal device, for example, attachment of the terminal device to a network and location changes of the terminal device; and the session management network element is responsible for session management of the terminal device, such as session setup, modification and releasing. In addition, decoupling of control and forwarding of a gateway device greatly simplifies design of a hardware platform and reduces costs of the hardware platform, thereby facilitating acceleration of deployment of a mobile packet data network. The MME is mainly responsible for control plane mobility management and session management, for example, user authentication and handover, mobility management of a terminal in an idle state, and user context and bearer management.

The forwarding plane network element 140 is responsible for packet processing and forwarding. The forwarding plane network element 140 may be a forwarding plane function of a packet data network (PDN) gateway (P-GW), a forwarding plane function of an serving gateway (S-GW), and a physical or virtual forwarding device such as a router and a switch.

The data network 150 provides for a user a data transmission service, which may be, for example, a packet data network (PDN) such as Internet and an Internet multi-media service (IP IMS).

The terminal device 110 or the access network device 120 may be a wireless communications sending apparatus and/or a wireless communications receiving apparatus. When sending data, the wireless communications sending apparatus may encode the data for use in transmission. The wireless communications sending apparatus may obtain (for example, generate, receive from another communications apparatus, or store in a memory) a quantity of data bits that need to be sent to the wireless communications receiving apparatus through a channel. These data bits may be included in a transport block (or a plurality of transport blocks) of the data, and the transport block may be segmented to generate a plurality of code blocks.

In addition, the communications system 100 may be a public land mobile network (PLMN), a device-to-device (D2D) network, a machine-to-machine (M2M) network, or another network. FIG. 1 is only a simplified schematic diagram used as an example, and the network may further include another network device, which is not drawn in FIG. 1.

The data transmission method and the device provided in the embodiments of this application may be applied to a terminal device, and the terminal device includes a hardware layer, an operating system layer running on the hardware layer, and an application layer running on the operating system layer. The hardware layer includes hardware such as a central processing unit (CPU), a memory management unit (MMU), and a memory (which is also referred to as a main memory). The operating system may be any one or more computer operating systems that implement service processing by using a process, such as a Linux operating system, a UNIX® operating system, an Android® operating system, an iOS operating system, or a Windows® operating system. The application layer includes applications such as a browser, a contact list, a word processing software, and an instant messaging software.

In addition, aspects or features of this application may be implemented as a method, an apparatus, or a product that uses standard programming and/or engineering technologies. The term "product" used in this application covers a computer program that can be accessed from any computer readable component, carrier, or medium. For example, the computer readable medium may include but is not limited to: a magnetic storage component (for example, a hard disk, a floppy disk, or a magnetic tape), an optical disc (for example, a compact disc (CD), a digital versatile disc (DVD)), a smart card, and a flash memory component (for example, erasable programmable read-only memory (EPROM), a card, a stick, or a key drive). In addition, various storage media described in this specification may indicate one or more devices and/or other machine-readable media that are used to store information. The term "machine-readable medium" may include but is not limited to, various media that can store, include, and/or carry an instruction and/or data.

Figure 3:
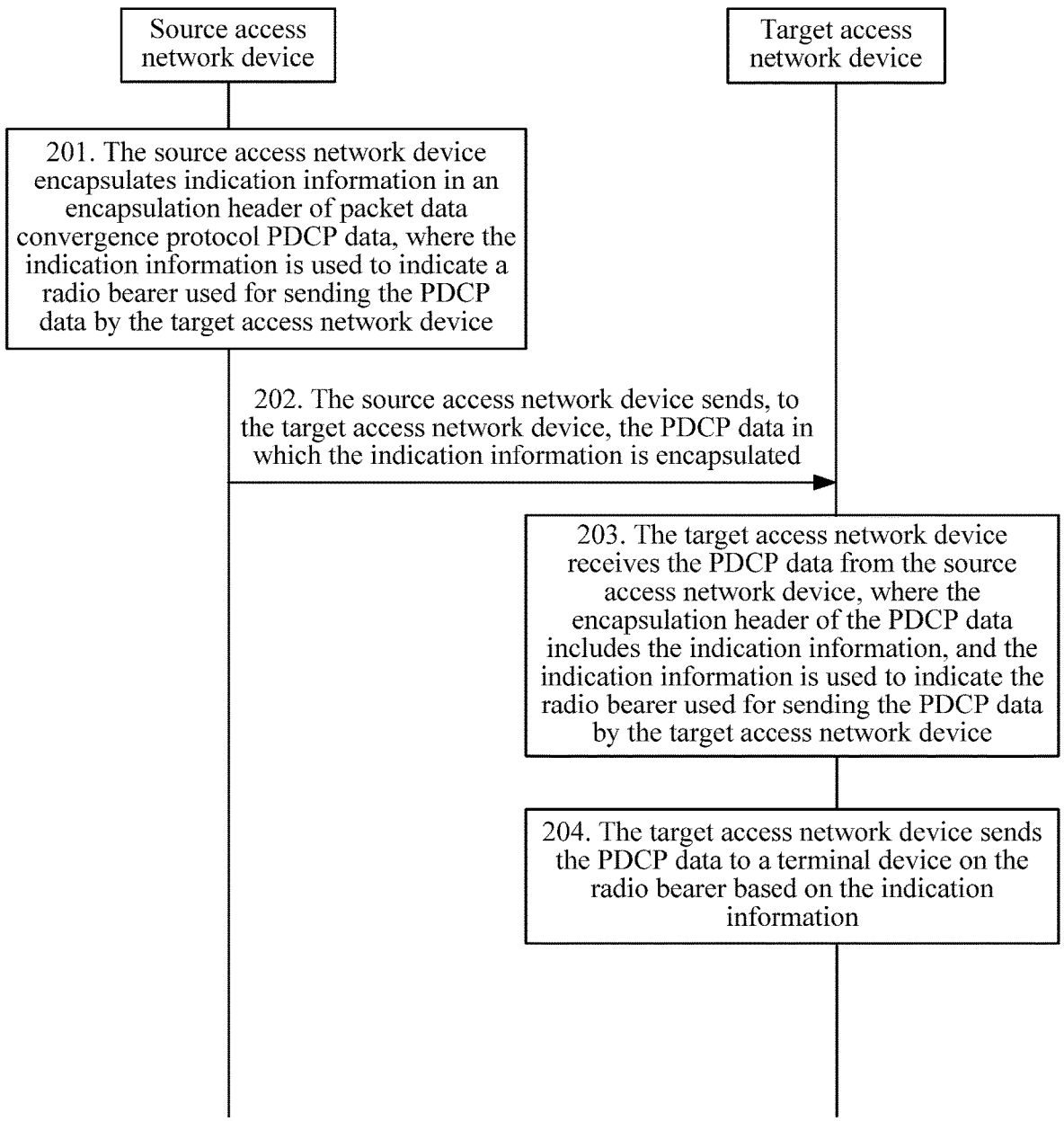
FIG. 3 is a schematic flowchart of a data transmission method according to an embodiment of this application.

FIG. 3 is a schematic flowchart of a data transmission method 200 according to an embodiment of this application. As shown in FIG. 3, the method 200 includes the following content.

201. A source access network device encapsulates indication information in an encapsulation header of packet data convergence protocol (PDCP) data, where the indication information is used to indicate a radio bearer used for sending the PDCP data by a target access network device.

Optionally, before performing 201, the source access network device determines whether PDCP processing has been performed on a buffered packet. If the PDCP processing has not been performed (for example, the packet is an IP packet), the processing does not need to be performed on the packet, the packet on which the PDCP processing has not been performed is directly encapsulated in a transmission packet format of the source access network device and the target access network device, and sent to the target access network device. If the PDCP processing has been performed, that is, the packet is PDCP data, the following processing needs to be performed on the packet: In this embodiment of this application, the indication information is encapsulated in a PDCP data header, and then, the PDCP data header in which the indication information is encapsulated is sent to the target access network device.

Optionally, the indication information includes at least one of the following information: a first radio bearer identifier, a quality of service marking, a quality of service marking and an IP address of a terminal device, a second radio bearer identifier, or a third radio bearer identifier.

For example, the first radio bearer identifier is allocated by a CP and used to identify a radio bearer between an access network and the terminal device. Optionally, the first radio bearer identifier remains unchanged during handover between the source access network device and the target access network device. For example, the source access network device may determine, based on the first radio bearer identifier, the radio bearer for sending the PDCP data to the terminal device. Similarly, the target access network device may also determine, based on the first radio bearer identifier, the radio bearer for sending the PDCP data to the terminal device.

The quality of service marking (QoS marking) is information in an encapsulation header of a packet transmitted between a core network user plane network element and a source access network, and is used to identify a quality of service requirement of data transmission. Different quality of service markings correspond to different radio bearers, and the target access network device sets up a radio resource based on the QoS marking.

The second radio bearer identifier is allocated by the target access network device, and is used to identify a radio bearer between the target access network device and the terminal device. For example, the second radio bearer identifier is used to identify a radio bearer that can be used for transmitting the PDCP data between the target access network device and the terminal device. Optionally, the second radio bearer identifier can indicate information about the radio bearer only in a target access network, and cannot indicate the information about the radio bearer in another access network.

The third radio bearer identifier is allocated by the source access network device, and is used to identify a radio bearer between the source access network device and the terminal device. For example, the third radio bearer identifier is used to identify a radio bearer that can be used for transmitting the PDCP data between the source access network device and the terminal device. Optionally, the third radio bearer identifier can indicate information about the radio bearer only in a source access network, and cannot indicate the information about the radio bearer in another access network.

Differences between the second radio bearer identifier or the third radio bearer identifier and the first radio bearer identifier lie in that: (1) Allocators are different. The first radio bearer identifier is allocated by the CP, and the second radio bearer identifier or the third radio bearer identifier is allocated by the access network. (2) Time lengths for the identifiers to remain unchanged are different: Even if the terminal device is handed over, the first radio bearer identifier still remains unchanged; however, the second radio bearer identifier or the third radio bearer identifier may change when the terminal device is handed over to different access networks, and a new radio bearer identifier is allocated by the target access network to which the terminal device is handed over.

Optionally, the source access network device may encapsulate the indication information in a transport layer protocol encapsulation header of the PDCP data.

For example, an example in which a transport layer protocol is a general packet radio service tunneling protocol for user plane (GTP-U) is used for description.

A header structure of the GTP-U protocol is shown in Table 1:

TABLE 1

| Byte | Bit | | | | | | | |
|---|---|---|---|---|---|---|---|---|
| | 8 | 7 | 6 | 5 | 4 | 3 | 2 | 1 |
| 1 | Version | | | PT | (*) | E | S | PN |
| 2 | Message type | | | | | | | |
| 3 | Packet length (not including a GTP header) (the first byte) | | | | | | | |
| 4 | Packet length (not including a GTP header) (the second byte) | | | | | | | |
| 5 | Tunnel endpoint identifier (the first byte) | | | | | | | |
| 6 | Tunnel endpoint identifier (the second byte) | | | | | | | |
| 7 | Tunnel endpoint identifier (the third byte) | | | | | | | |
| 8 | Tunnel endpoint identifier (the fourth byte) | | | | | | | |
| 9 | Sequence number (the first byte) | | | | | | | |
| 10 | Sequence number (the second byte) | | | | | | | |
| 11 | Next-generation packet data unit number | | | | | | | |
| 12 | Next-generation extension header type | | | | | | | |

In this embodiment of this application, the GTP-U protocol may support encapsulation of the indication information by extending the GTP-U. A specific extension manner includes two cases: (1) direct extending the GTP-U; and (2) extending the GTP-U protocol by using a next-generation extension header type.

Case 1: Directly extend the GTP-U protocol, as shown in Table 2:

TABLE 2

| Byte | Bit | | | | | | | |
|---|---|---|---|---|---|---|---|---|
| | 8 | 7 | 6 | 5 | 4 | 3 | 2 | 1 |
| 1 | Version | | | PT | (*) | E | S | PN |
| 2 | Message type | | | | | | | |
| 3 | Packet length (not including a GTP header) (the first byte) | | | | | | | |
| 4 | Packet length (not including a GTP header) (the second byte) | | | | | | | |
| 5 | Tunnel endpoint identifier (the first byte) | | | | | | | |
| 6 | Tunnel endpoint identifier (the second byte) | | | | | | | |
| 7 | Tunnel endpoint identifier (the third byte) | | | | | | | |
| 8 | Tunnel endpoint identifier (the fourth byte) | | | | | | | |
| 9 | Sequence number (the first byte) | | | | | | | |
| 10 | Sequence number (the second byte) | | | | | | | |
| 11 | Next-generation packet data unit number | | | | | | | |
| 12 | Indication information | | | | | | | |
| ... | ... | | | | | | | |
| n | Next-generation extension header type | | | | | | | |

Case 2: Indirectly extend the GTP-U protocol by using an extension capability of the transport layer protocol, for example, extend the GTP-U protocol by using the next-generation extension header type, as shown in Table 3.

TABLE 3

| Byte 1 | 0x01 |
|---|---|
| Bytes 2 to 3 | Indication information |
| Byte 4 | Next-generation extension header type |

Optionally, the source access network device may alternatively encapsulate the indication information in a data link layer protocol encapsulation header of the PDCP data.

For example, an extension manner is directly extending a PDCP protocol, so that the PDCP protocol supports encapsulation of the indication information. The PDCP protocol uses a 12-bit sequence number (SN), and an extension manner is shown in Table 4:

TABLE 4

| D/C | R | R | R | PDCP SN | Byte 1 |
|---|---|---|---|---|---|
| PDCP SN (cont.) | | | | | Byte 2 |
| Indication information | | | | | Byte 3 |
| Data Data | | | | | Byte 4 |
| ... | | | | | Byte N |

Optionally, the PDCP data may be the byte 4 to the byte N in Table 4.

Optionally, the target access network device may determine, based on the indication information, the radio bearer for sending the PDCP data.

202. The source access network device sends, to the target access network device, the PDCP data in which the indication information is encapsulated.

Optionally, the source access network device sends the PDCP data to the target access network device through a forwarding tunnel. For example, the forwarding tunnel is used to transmit one or more service packets of the terminal device.

Optionally, the forwarding tunnel may be a direct forwarding tunnel or an indirect forwarding tunnel.

Optionally, the forwarding tunnel may be a tunnel of a session granularity or a tunnel of a group granularity.

Optionally, specific processing manners of the PDCP data may be classified into two cases based on the forwarding tunnel.

Case 1: The forwarding tunnel is a tunnel of a session granularity.

Optionally, when the forwarding tunnel is a tunnel of a session granularity, the indication information may be at least one of the first radio bearer identifier, the quality of service marking, the second radio bearer identifier, and the third radio bearer identifier.

Optionally, when the forwarding tunnel is a tunnel of a session granularity, the first radio bearer identifier, the quality of service marking, the second radio bearer identifier, or the third radio bearer identifier is used as the indication information and encapsulated in the encapsulation header of the PDCP data. The processed PDCP data may be sent to the target access network device through the forwarding tunnel between the source access network device and the target access network device. In this case, the forwarding tunnel may be a direct forwarding tunnel or an indirect forwarding tunnel.

It should be noted that, the PDCP data may be uplink PDCP data, or downlink PDCP data.

For example, a downstream packet is used as an example. The source access network device receives a downstream packet, and determines, based on encapsulation header information (a QoS marking) in the downstream packet, a radio bearer corresponding to the downstream packet. Then, the source access network device processes, for example, decapsulates or encapsulates a part of the downstream packet, to obtain a processed packet, which is PDCP data. The source access network device determines, based on a correspondence between the radio bearer and a first radio bearer identifier, the first radio bearer identifier corresponding to the PDCP data, and encapsulates the first radio bearer identifier in an encapsulation header of the PDCP data.

For another example, the source access network device receives a downstream packet, and determines, based on encapsulation header information (a QoS marking) in the downstream packet, the QoS marking corresponding to the downstream packet. Then, the source access network device processes, for example, decapsulates or encapsulates a part of the downstream packet, to obtain a processed packet, which is PDCP data. The source access network device uses the QoS marking as indication information and encapsulates the indication information in an encapsulation header of the PDCP data. Optionally, the source access network device receives a downstream packet, and further determines, based on encapsulation header information in the downstream packet, a radio bearer corresponding to the downstream packet.

For another example, the source access network device receives a downstream packet, and determines, based on encapsulation header information (a QoS marking) in the downstream packet, the QoS marking corresponding to the downstream packet. Then, the source access network device processes, for example, decapsulates or encapsulates a part of the downstream packet, to obtain a processed packet, which is PDCP data. The source access network device determines, based on a correspondence between the QoS marking and a second radio bearer identifier, a second radio bearer identifier corresponding to the PDCP data, and encapsulates the second radio bearer identifier in an encapsulation header of the PDCP data. Optionally, the source access network device receives a downstream packet, and further determines, based on encapsulation header information in the downstream packet, a radio bearer corresponding to the downstream packet.

For another example, the source access network device receives a downstream packet, and determines, based on encapsulation header information (a QoS marking) in the downstream packet, a radio bearer corresponding to the downstream packet. Then, the source access network device processes, for example, decapsulates or encapsulates a part of the downstream packet, to obtain a processed packet, which is PDCP data. The source access network device determines, based on a correspondence between the radio bearer and a third radio bearer identifier, a third radio bearer identifier corresponding to the PDCP data, and determines, based on a correspondence between the third radio bearer identifier and a second radio bearer identifier, the second radio bearer identifier corresponding to the PDCP data, and encapsulates the second radio bearer identifier in an encapsulation header of the PDCP data.

For still another example, the source access network device receives a downstream packet, and determines, based on encapsulation header information (a QoS marking) in the downstream packet, a radio bearer corresponding to the downstream packet. Then, the source access network device processes, for example, decapsulates or encapsulates a part of the downstream packet, to obtain a processed packet, which is PDCP data. The source access network device determines, based on a correspondence between the radio bearer and a third radio bearer identifier, the third radio bearer identifier corresponding to the PDCP data, and encapsulates the third radio bearer identifier in an encapsulation header of the PDCP data.

Determining the radio bearer corresponding to the downstream packet, the source access network device then processes, for example, decapsulates or encapsulates a part of the downstream packet, to obtain a processed packet, which is the PDCP data. The source access network may determine the second radio bearer identifier corresponding to the PDCP data, based on the correspondence between the third radio bearer identifier and the second radio bearer identifier or based on the correspondence between the QoS marking and the second radio bearer identifier; and encapsulate the second radio bearer identifier in the encapsulation header of the PDCP data. Alternatively, the source access network may directly determine the third radio bearer identifier, and encapsulate the third radio bearer identifier in the encapsulation header of the PDCP data. The processed PDCP data may be sent to the target access network device through a forwarding tunnel between the source access network device and the target access network device. In this case, the forwarding tunnel may be a direct forwarding tunnel or an indirect forwarding tunnel. The indication information may be the second radio bearer identifier or the third radio bearer identifier.

Case 2: The forwarding tunnel is a tunnel of a group granularity.

Optionally, when the forwarding tunnel is a tunnel of a group granularity, the indication information may be at least one of the first radio bearer identifier, the quality of service marking and the IP address of the terminal device, the second radio bearer identifier, and the third radio bearer identifier.

Optionally, when the forwarding tunnel is a tunnel of a group granularity, the first radio bearer identifier, the quality of service marking and the IP address of the terminal device, the second radio bearer identifier, or the third radio bearer identifier is used as the indication information and encapsulated in the encapsulation header of the PDCP data. The processed PDCP data may be sent to the target access network device through a forwarding tunnel between the source access network device and the target access network device. In this case, the forwarding tunnel may be a direct forwarding tunnel or an indirect forwarding tunnel.

For example, the source access network device receives a downstream packet, and determines, based on encapsulation header information (a QoS marking and an IP address of the terminal device) in the downstream packet, the QoS marking and the IP address of the terminal device that correspond to the downstream packet. Then, the source access network device processes, for example, decapsulates or encapsulates a part of the downstream packet, to obtain a processed packet, which is PDCP data. The source access network device encapsulates the QoS marking and the IP address of the terminal device in an encapsulation header of the PDCP data.

Other examples are similar to Case 1, and details are not described herein again.

It should be noted that, in the foregoing description, when the forwarding tunnel is a tunnel of a session granularity, the source access network device may use the first radio bearer identifier, the quality of service marking QoS marking, the second radio bearer identifier, or the third radio bearer identifier as the indication information; when the forwarding tunnel is a tunnel of a group granularity, the source access network device may use the first radio bearer identifier, the QoS marking and the IP address of the terminal device, the second radio bearer identifier, or the third radio bearer identifier as the indication information. However, the access network device does not need to perceive a tunnel granularity.

Optionally, in the cases described above, when the source access network device and the target access network device are communicatively connected through an indirect forwarding tunnel, the source access network device performs signaling communication with the target access network device by using a core network control plane network element, for example, sends a handover request message to the target access network device and receives a handover request acknowledgment message sent by the target access network device; and performs data communication with the target access network device by using the core network user plane network element, for example, sends PDCP data to the target access network device.

Figure 4:
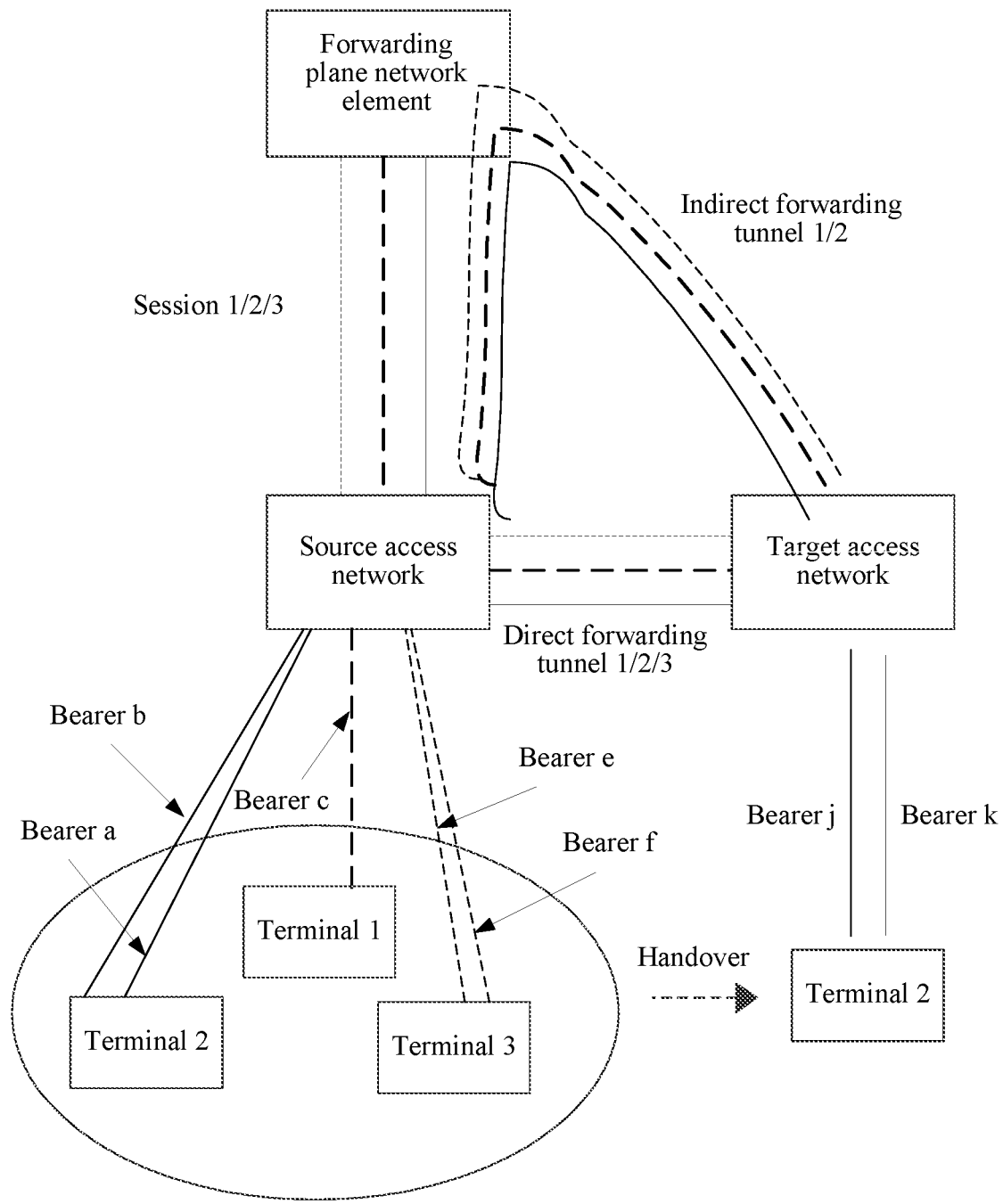
FIG. 4 is a schematic diagram of a forwarding tunnel.

For example, as shown in FIG. 4, the forwarding tunnel may be a tunnel of a session granularity. When a terminal 2 is handed over from a source access network to a target access network, the source access network device may send PDCP data to the target access network device through a direct forwarding tunnel, or send PDCP data to the target access network device through an indirect forwarding tunnel. A terminal device may simultaneously perform services on a plurality of radio bearers (for example, the terminal 2 performs services on a bearer a and a bearer b, and a terminal 3 performs services on a bearer e and a bearer f), or may perform a service on only one radio bearer (for example, a terminal 1 performs a service on only a bearer c). A source access network device may simultaneously perform service contact with a plurality of terminals such as the terminal 1, the terminal 2, and the terminal 3. As shown in the figure, each terminal device has at least one session resource. When the terminal 2 is handed over from the source access network to the target access network, the radio bearers a and b between the terminal 2 and the source access network device are disconnected, radio bearers j and k between the terminal 2 and the target access network device are set up, and a forwarding tunnel between the source access network device and the target access network device is set up. The source access network device sends, to the target access network device, PDCP data in which indication information is encapsulated, so that the target access network device determines the bearer j for sending the PDCP data. In this case, the indication information may be the first radio bearer identifier, the quality of service marking, the second radio bearer identifier, or the third radio bearer identifier.

Figure 5:
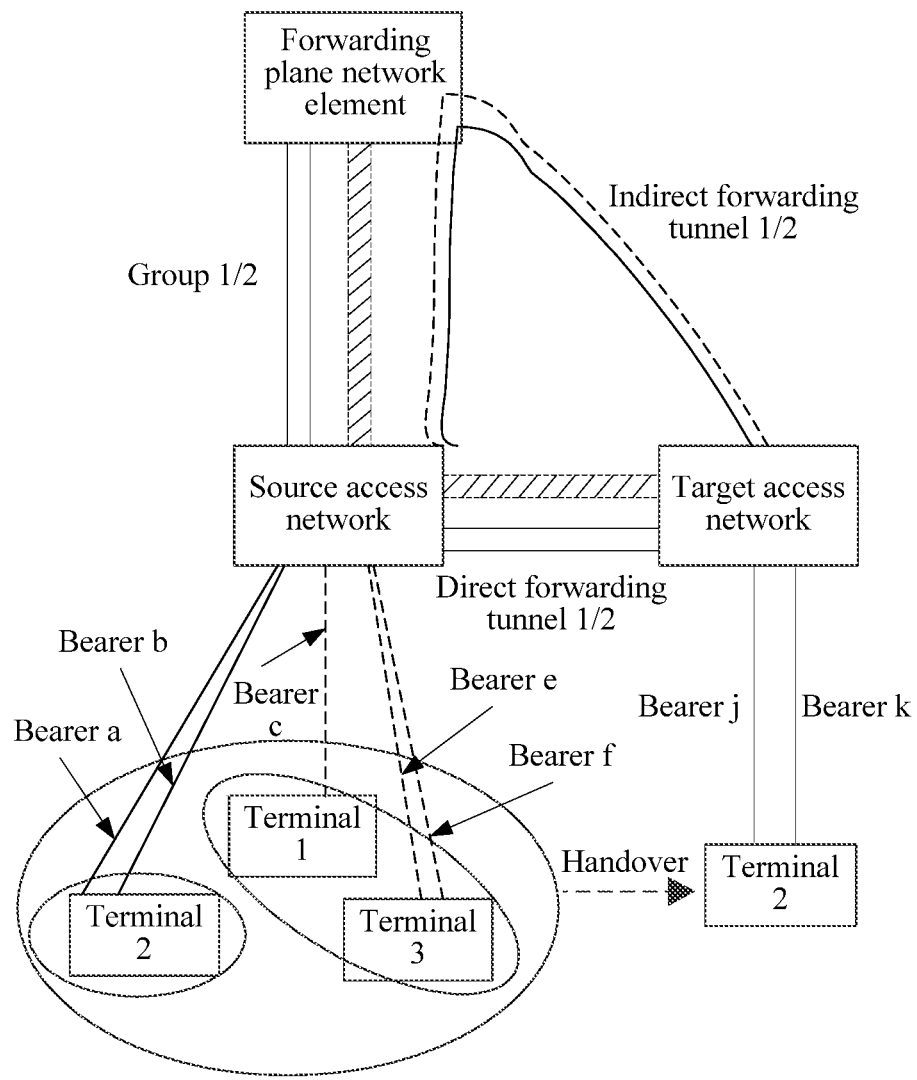
FIG. 5 is a schematic diagram of another forwarding tunnel.

For another example, as shown in FIG. 5, the forwarding tunnel may be a tunnel of a group granularity. When a terminal 2 is handed over from a source access network to a target access network, the source access network device may send PDCP data to the target access network device through a direct forwarding tunnel, or send PDCP data to the target access network device through an indirect forwarding tunnel. A terminal device may simultaneously perform services on a plurality of radio bearers (for example, the terminal 2 performs services on a bearer a and a bearer b, and a terminal 3 performs services on a bearer e and a bearer f), or may perform a service on only one radio bearer (for example, a terminal 1 performs a service on only a bearer c). A source access network device may simultaneously perform service contact with a plurality of terminals such as the terminal 1, the terminal 2, and the terminal 3. Terminals having a same service type may be classified into a group. As shown in the figure, the terminal 1 and the terminal 3 occupy a group resource, and the terminal 2 occupies a group resource. Similarly, when the terminal 2 is handed over from the source access network to the target access network, the radio bearers a and b between the terminal 2 and the source access network device are disconnected, radio bearers j and k between the terminal 2 and the target access network device are set up, and a forwarding tunnel between the source access network device and the target access network device is set up. The source access network device sends, to the target access network device, PDCP data in which indication information is encapsulated, so that the target access network device determines the bearer j for sending the PDCP data. In this case, the indication information may be the quality of service marking and the IP address of the terminal 2, the second radio bearer identifier, or the third radio bearer identifier.

Optionally, the source access network device sends the PDCP data to the target access network device by using the core network user plane network element. In this case, the source access network device sends the PDCP data to the target access network device through an indirect forwarding tunnel.

203. The target access network device receives the PDCP data from the source access network device, where the encapsulation header of the PDCP data includes the indication information, and the indication information is used to indicate the radio bearer used for sending the PDCP data by the target access network device.

Optionally, the target access network device receives the PDCP data from the source access network device through the foregoing forwarding tunnel.

204. The target access network device sends the PDCP data to a terminal device on the radio bearer based on the indication information.

Optionally, the target access network device determines, based on the indication information, the radio bearer for sending the PDCP data, and sends the PDCP data to the terminal device on the radio bearer.

When the indication information is the first radio bearer identifier, it is determined that a radio bearer identified by the first radio bearer identifier is the radio bearer used for sending the PDCP data.

When the indication information is the second radio bearer identifier, it is determined that a radio bearer identified by the second radio bearer identifier is the radio bearer used for sending the PDCP data.

When the indication information is the third radio bearer identifier, the second radio bearer identifier corresponding to the third radio bearer identifier is determined, and it is determined that a radio bearer identified by the second radio bearer identifier is the radio bearer used for sending the PDCP data.

When the indication information is the quality of service marking QoS marking, it is determined that a radio bearer corresponding to the quality of service marking QoS marking is the radio bearer used for sending the PDCP data.

When the indication information is the QoS marking and the IP address of the terminal device, it is determined that a radio bearer corresponding to the quality of service marking and the IP address of the terminal device is the radio bearer used for sending the PDCP data.

Figure 6:
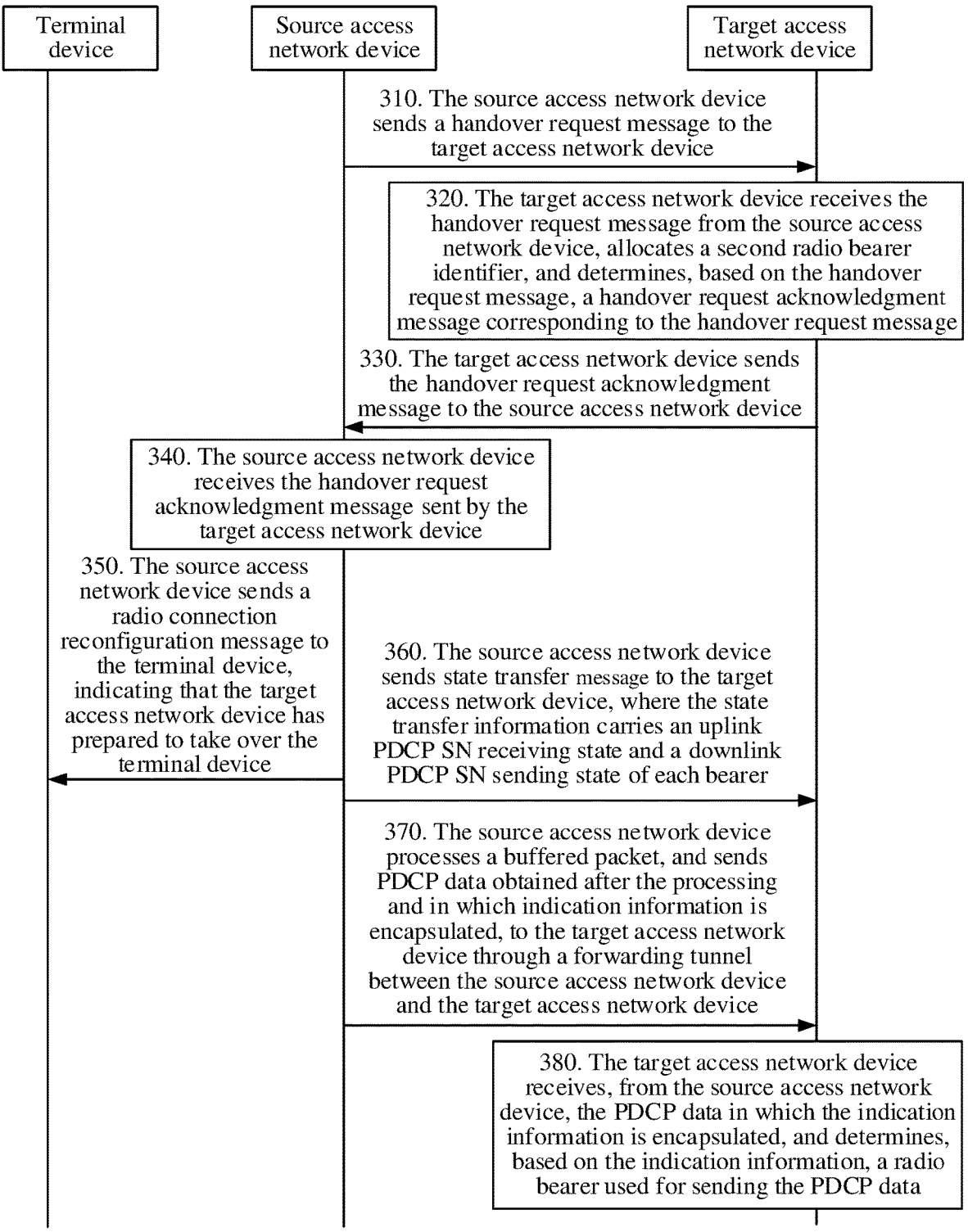
FIG. 6 is a schematic flowchart of a data transmission method according to another embodiment of this application.

Optionally, in an embodiment, as shown in FIG. 6, the method 300 may include the following operations.

310. A source access network device sends a handover request message to a target access network device.

The handover request message may carry a bearer level QoS parameter, an uplink user plane tunnel information, and at least one of the following information: a third radio bearer identifier and a quality of service marking.

Optionally, when a forwarding tunnel is a tunnel of a group granularity, the handover request message may further carry an IP address of a terminal device.

Optionally, the third radio bearer identifier is allocated by the source access network device, and is used to identify a radio bearer between the source access network device and the terminal device. Optionally, the third radio bearer identifier can indicate information about the radio bearer only in a source access network, and cannot indicate the information about the radio bearer in another access network. Optionally, in a session setup process, the source access network device sets up a third radio bearer based on contextual information sent by a control plane network element, and allocates the third radio bearer identifier. Optionally, when the quality of service marking QoS marking is preconfigured on an access network device, the parameter is optional. The contextual information sent by the control plane network element includes the quality of service marking.

Optionally, the third radio bearer identifier includes at least one radio bearer identifier.

For example, as shown in FIG. 4 or FIG. 5, the third radio bearer identifier may include an identifier of the bearer a and an identifier of the bearer b for the terminal 2, an identifier of the bearer e and an identifier of the bearer f for the terminal 3, or an identifier of the bearer c for the terminal 1.

320. The target access network device receives the handover request message from the source access network device, allocates a second radio bearer identifier, and determines, based on the handover request message, a handover request acknowledgment message corresponding to the handover request message.

For example, the handover request acknowledgment message may include: the second radio bearer identifier, a correspondence between the second radio bearer identifier and the third radio bearer identifier, or a correspondence between the second radio bearer identifier and the quality of service marking.

In addition, the handover request acknowledgment message may include none of: the second radio bearer identifier, the correspondence between the second radio bearer identifier and the third radio bearer identifier, or the correspondence between the second radio bearer identifier and the quality of service marking.

Optionally, the target access network device stores the correspondence between the second radio bearer identifier and the third radio bearer identifier.

Optionally, the second radio bearer identifier includes at least one radio bearer identifier.

For example, in the example of FIG. 4 or FIG. 5, the second radio bearer identifier includes an identifier ID_J of the radio bearer j and an identifier ID_K of the radio bearer k.

For example, as shown in Table 5, with reference to the example of FIG. 4 or FIG. 5, and the correspondence between the second radio bearer identifier and the third radio bearer identifier, details are described as follows: The second radio bearer identifier may include the identifier ID_J of the bearer j and the identifier ID_K of the bearer k, and the third radio bearer identifier may include an identifier ID_A of the bearer a and an identifier ID_B of the bearer b. The source access network device determines that the correspondence between the second radio bearer identifier and the third radio bearer identifier may be: The radio bearer identifier J corresponds to the radio bearer identifier A, and the radio bearer identifier K corresponds to the radio bearer identifier B.

TABLE 5

| Second radio bearer identifier | Third radio bearer identifier |
|---|---|
| Identifier J | Identifier A |
| Identifier K | Identifier B |

For example, as shown in Table 6, for the correspondence between the second radio bearer identifier and the quality of service marking QoS marking, details are described as follows: The second radio bearer identifier may include an identifier a, an identifier b, and an identifier c, and the QoS marking in the source access network may include a QoS marking A, a QoS marking B, and a QoS marking C. The source access network device determines that the correspondence between the second radio bearer identifier and the QoS marking may be: The identifier a corresponds to the QoS marking A, the identifier b corresponds to the QoS marking B, and the identifier c corresponds to the QoS marking C.

TABLE 6

| Second radio bearer identifier | QoS marking |
|---|---|
| Identifier a | QoS marking A |
| Identifier b | QoS marking B |
| Identifier c | QoS marking C |

330. The target access network device sends the handover request acknowledgment message to the source access network device.

Optionally, the handover request acknowledgment message carries uplink (UL) forwarding tunnel information, downlink (DL) forwarding tunnel information, and at least one of the following information: the second radio bearer identifier, the correspondence between the second radio bearer identifier and the third radio bearer identifier, and the correspondence between the second radio bearer identifier and the QoS marking.

The uplink forwarding tunnel information includes an IP address of a target access network, a tunnel endpoint identifier 1 (for example, target AN TEID 1) of the target access network, and the like.

The downlink forwarding tunnel information includes an IP address of a target access network, a tunnel endpoint identifier 2 (for example, target AN TEID 2) of the target access network, and the like.

340. The source access network device receives the handover request acknowledgment message sent by the target access network device.

Optionally, when the handover request acknowledgment message carries the second radio bearer identifier, the source access network device determines the correspondence between the second radio bearer identifier and the third radio bearer identifier.

350. The source access network device sends a radio connection reconfiguration message to the terminal device, indicating that the target access network device has prepared to take over the terminal device.

360. The source access network device sends a state transfer message to the target access network device, where the state transfer message carries an uplink packet data convergence protocol sequence number (Packet Data Convergence Protocol Sequence Number, PDCP SN) receiving state and a downlink PDCP SN sending state of each bearer.

370. The source access network device processes a buffered packet, and sends the packet to the target access network device through a forwarding tunnel between the source access network device and the target access network device.

Optionally, the source access network device determines whether PDCP processing has been performed on the buffered packet.

If the PDCP processing has not been performed (for example, the packet is an IP packet), the processing does not need to be performed on the packet, the packet on which the PDCP processing has not been performed is directly encapsulated in a transmission packet format of the source access network device and the target access network device, and sent to the target access network device.

If the PDCP processing has been performed, that is, the packet is PDCP data, the following processing needs to be performed on the packet: In this embodiment of this application, the indication information is encapsulated in a PDCP data header, and then, the PDCP data header in which the indication information is encapsulated is sent to the target access network device.

Case 1: The forwarding tunnel is a tunnel of a session granularity. The indication information may be the second radio bearer identifier, the third radio bearer identifier, or the quality of service marking (QoS marking).

For example, the source access network device determines, based on a QoS marking corresponding to the PDCP data, to encapsulate the QoS marking in the encapsulation header of the PDCP data. Downlink data is used as an example. The source access network device determines, based on an encapsulation header (a QoS marking) of received downlink data, the QoS marking corresponding to the downlink data, and then the source access network device processes, for example, encapsulates or decapsulates, the downlink data to obtain the PDCP data.

For another example, the source access network device determines, based on the QoS marking corresponding to the PDCP data and the correspondence between the second radio bearer identifier and the QoS marking, the second radio bearer identifier corresponding to the PDCP data, and then determines the second radio bearer identifier as the indication information and encapsulates the indication information in the PDCP data.

For another example, the source access network device determines, based on the QoS marking corresponding to the PDCP data, the radio bearer corresponding to the PDCP data, and determines, based on the correspondence between the radio bearer and the third radio bearer identifier, the third radio bearer identifier corresponding to the PDCP data, uses the third radio bearer identifier as the indication information, and encapsulates the indication information in the PDCP data.

For another example, the source access network device determines, based on the QoS marking corresponding to the PDCP data, the radio bearer corresponding to the PDCP data; determines, based on the correspondence between the radio bearer and the third radio bearer identifier, the third radio bearer identifier corresponding to the PDCP data; and determines, based on the correspondence between the third radio bearer identifier and the second radio bearer identifier, the second radio bearer identifier corresponding to the PDCP data, uses the second radio bearer identifier as the indication information, and encapsulates the indication information in the PDCP data.

Case 2: When the forwarding tunnel is a tunnel of a group granularity, the indication information may be the second radio bearer identifier, the third radio bearer identifier, or the QoS marking and the IP address of the terminal device.

For example, the source access network device determines, based on the QoS marking corresponding to the PDCP data and the IP address of the terminal device, to encapsulate the QoS marking and the IP address of the terminal device in the encapsulation header of the PDCP data. Downlink data is used as an example. The source access network device determines, based on an encapsulation header (a QoS marking) of received downlink data, the QoS marking corresponding to the downlink data and the IP address of the terminal device, and then the source access network device processes, for example, encapsulates or decapsulates, the downlink data to obtain the PDCP data.

380. The target access network device receives, from the source access network device, the PDCP data in which the indication information is encapsulated, and determines, based on the indication information, a radio bearer used for sending the PDCP data.

For example, when the indication information is the second radio bearer identifier, it is determined that a radio bearer identified by the second radio bearer identifier is the radio bearer used for sending the PDCP data.

When the indication information is the third radio bearer identifier, the second radio bearer identifier corresponding to the third radio bearer identifier is determined, and it is determined that a radio bearer identified by the second radio bearer identifier is the radio bearer used for sending the PDCP data.

When the indication information is the quality of service marking QoS marking, it is determined that a radio bearer corresponding to the quality of service marking QoS marking is the radio bearer used for sending the PDCP data.

When the indication information is the QoS marking and the IP address of the terminal device, it is determined that a radio bearer corresponding to the quality of service marking and the IP address of the terminal device is the radio bearer used for sending the PDCP data.

After operation 380, some other operations may further be included. For example, the terminal device sends a radio connection reconfiguration complete message to the target access network device, indicating that the terminal device has accessed the target access network device; the target access network device sends a path handover request to the control plane network element CP, where the path handover request carries downlink user plane tunnel information; the CP sends a user plane path update request to a UP, where the user plane path update request carries the downlink user plane tunnel information, and the UP returns a user plane path answer message; the UP sends an end marker on a path before the handover, where the end marker may be an end marker (end marker) packet, the end marker indicates that the packet is the last packet on the path before handover, and the end marker is sent by the UP to the source access network device and forwarded by the source access network device to the target access network device; the CP sends a path handover acknowledgment message to the target access network device; and the target access network device sends a resource releasing message to the source access network device, to trigger the source access network device to release a resource related to the terminal device, including a radio resource, a control plane resource, and the like.

For operation 310 and 380, refer to the descriptions of operation 201 to 204 in FIG. 2, and details are not described herein again.

In the foregoing several cases, the source access network device may determine the second radio bearer identifier, that is, the radio bearer identifier allocated by the target access network device, as the indication information; determine the quality of service marking as the indication information; determine the quality of service marking and the IP address of the terminal device as the indication information; or determine the third radio bearer identifier, that is, the radio bearer identifier allocated by the source access network device, as the indication information.

In the method 300, in a process in which the terminal device is handed over from the source access network device to the target access network device, the source access network device processes the buffered PDCP data, adds the indication information to the encapsulation header of the PDCP data, and sends the PDCP data to the target access network device through the forwarding tunnel between the source access network device and the target access network device; and the target access network device sends the packet to the correct radio bearer based on the encapsulation header information of the received packet, thereby resolving a problem that data in the handover process cannot be accurately forwarded when the forwarding tunnel is a tunnel of a session granularity or a group granularity.

Figure 7:
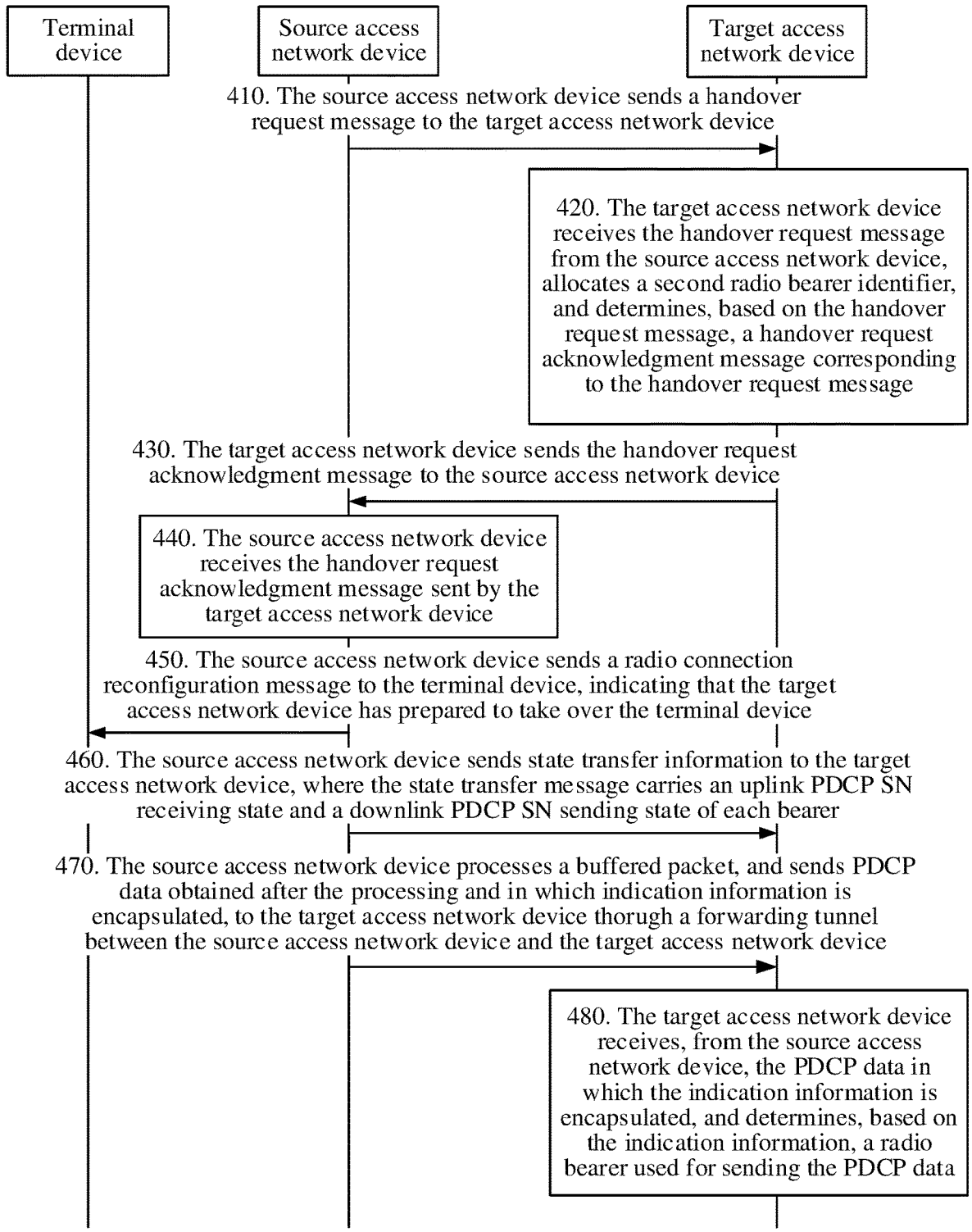
FIG. 7 is a schematic flowchart of a data transmission method according to still another embodiment of this application.

Optionally, in an embodiment, a method 400 may be shown in FIG. 7. A difference between the method 400 and the method 300 lies in that, the radio bearer identifier in the method 300 is allocated by an access network device, and in the method 400 shown in this embodiment, a radio bearer identifier is allocated by a control plane network element CP. The method 400 includes the following operations.

410. A source access network device sends a handover request message to a target access network device.

Optionally, when a forwarding tunnel is a tunnel of a session granularity, the handover request message may carry a bearer level QoS parameter, uplink user plane tunnel information, and at least one of the following information: a first radio bearer identifier and a QoS marking.

Optionally, when the forwarding tunnel is a tunnel of a group granularity, the handover request message may further carry an IP address of a terminal device.

For example, the first radio bearer identifier is allocated by a CP and used to identify a radio bearer between an access network and the terminal device. The quality of service marking (QoS marking) is information in an encapsulation header of a packet transmitted between a core network user plane network element and a source access network, and is used to identify a quality of service requirement of data transmission. Different quality of service markings correspond to different radio bearers, and the target access network device sets up a radio resource based on the QoS marking. Optionally, when the quality of service marking QoS marking is preconfigured on an access network device, the parameter is optional. The contextual information sent by the control plane network element includes the quality of service marking.

420. The target access network device receives the handover request message from the source access network device, allocates a radio resource to the terminal device, and determines, based on the handover request message, a handover request acknowledgment message corresponding to the handover request message.

Optionally, the handover request acknowledgment message carries the first radio bearer identifier, uplink (UL) forwarding tunnel information, and downlink (DL) forwarding tunnel information.

The uplink forwarding tunnel information includes an IP address of a target access network, a tunnel endpoint identifier 1 (for example, target AN TEID 1) of the target access network, and the like.

The downlink forwarding tunnel information includes an IP address of a target access network, a tunnel endpoint identifier 2 (for example, target AN TEID 2) of the target access network, and the like.

430. The target access network device sends the handover request acknowledgment message to the source access network device.

440. The source access network device receives the handover request acknowledgment message sent by the target access network device.

450. The source access network device sends a radio connection reconfiguration message to the terminal device, indicating that the target access network device has prepared to take over the terminal device.

460. The source access network device sends a state transfer message to the target access network device, where the state transfer message carries an uplink packet data convergence protocol sequence number (PDCP SN) receiving state and a downlink PDCP SN sending state of each bearer.

470. The source access network device processes a buffered packet, and sends the packet to the target access network device through a forwarding tunnel between the source access network device and the target access network device.

Optionally, the source access network device determines whether PDCP processing has been performed on the buffered packet.

Optionally, if the PDCP processing has not been performed (for example, the packet is an IP packet), the processing does not need to be performed on the packet, the packet on which the PDCP processing has not been performed is directly encapsulated in a transmission packet format of the source access network device and the target access network device, and sent to the target access network device.

Optionally, if the PDCP processing has been performed, that is, the packet is PDCP data, the following processing needs to be performed on the packet: In this embodiment of this application, the indication information is encapsulated in a PDCP data header, and then, the PDCP data in which the indication information is encapsulated is sent to the target access network device.

Case 1: The forwarding tunnel is a tunnel of a session granularity. The indication information may be the first radio bearer identifier, or the quality of service marking QoS marking.

For example, the source access network device determines to encapsulate the first radio bearer identifier in the encapsulation header of the PDCP data based on the first radio bearer identifier corresponding to the PDCP data. Downlink data is used as an example. The source access network device determines, based on an encapsulation header (a QoS marking) of received downlink data, a first radio bearer identifier corresponding to the downlink data, and then the source access network device processes, for example, encapsulates or decapsulates, the downlink data to obtain the PDCP data.

For another example, the source access network device determines, based on a QoS marking corresponding to the PDCP data, to encapsulate the QoS marking in the encapsulation header of the PDCP data. Downlink data is used as an example. The source access network device determines, based on an encapsulation header (a QoS marking) of received downlink data, the QoS marking corresponding to the downlink data, and then the source access network device processes, for example, encapsulates or decapsulates, the downlink data to obtain the PDCP data.

Case 2: The forwarding tunnel is a tunnel of a group granularity. The indication information may be the first radio bearer identifier, and the quality of service marking and the IP address of the terminal device.

For example, the source access network device determines, based on the QoS marking corresponding to the PDCP data and the IP address of the terminal device, to encapsulate the QoS marking and the IP address of the terminal device in the encapsulation header of the PDCP data. Downlink data is used as an example. The source access network device determines, based on an encapsulation header (a QoS marking) of received downlink data, the QoS marking corresponding to the downlink data and the IP address of the terminal device, and then the source access network device processes, for example, encapsulates or decapsulates, the downlink data to obtain the PDCP data.

Optionally, before the source access network device sends the PDCP data to the target access network device, the source access network device determines the radio bearer for sending the PDCP data. Optionally, the source access network device determines the indication information based on the radio bearer. For example, the source access network device determines, based on the correspondence between the radio bearer and the first radio bearer identifier, that the indication information is the first radio bearer identifier; determines, based on the correspondence between the radio bearer and the quality of service marking, that the indication information is the quality of service marking; or determines, based on the correspondence between the radio bearer and the quality of service marking and the IP address of the terminal device, that the indication information is the quality of service marking and the IP address of the terminal device.

480. The target access network device receives, from the source access network device, the PDCP data in which the indication information is encapsulated, and determines, based on the indication information, a radio bearer used for sending the PDCP data.

For example, when the indication information is the first radio bearer identifier, it is determined that a radio bearer identified by the first radio bearer identifier is the radio bearer used for sending the PDCP data.

When the indication information is the quality of service marking QoS marking, it is determined that a radio bearer corresponding to the quality of service marking QoS marking is the radio bearer used for sending the PDCP data.

When the indication information is the QoS marking and the IP address of the terminal device, it is determined that a radio bearer corresponding to the quality of service marking and the IP address of the terminal device is the radio bearer used for sending the PDCP data.

After operation 480, some other operations may further be included. For example, the terminal device sends a radio connection reconfiguration complete massage to the target access network device, indicating that the terminal device has accessed the target access network device; the target access network device sends a path handover request to the control plane network element CP, where the path handover request carries downlink user plane tunnel information; the target access network device sends a path handover request to the control plane network element CP, where the path handover request carries downlink user plane tunnel information; the CP sends a user plane path update request to a UP, where the user plane path update request carries the downlink user plane tunnel information, and the UP returns a user plane path answer message; the UP sends an end marker on a path before the handover, where the end marker may be an end marker (end marker) packet, the end marker indicates that the packet is the last packet on the path before handover, and the end marker is sent by the UP to the source access network device and forwarded by the source access network device to the target access network device; the CP sends a path handover acknowledgment message to the target access network device; and the target access network device sends a resource releasing message to the source access network device, to trigger the source access network device to release a resource related to the terminal device, including a radio resource, a control plane resource, and the like.

For operation 410 and 480, refer to the descriptions of operation 201 to 204 in FIG. 2, and details are not described herein again.

In the foregoing several cases, the source access network device may determine the first radio bearer identifier, that is, the radio bearer identifier allocated by the CP, as the indication information; determine the QoS marking as the indication information; or determine the QoS marking and the IP address of the terminal device as the indication information.

In the method 400, in a process in which the terminal device is handed over from the source access network device to the target access network device, the source access network device processes the buffered PDCP data, adds the first radio bearer identifier, the QoS marking, or the QoS marking and the IP address of the terminal device to the encapsulation header of the PDCP data, and sends the PDCP data to the target access network device through the forwarding tunnel between the source access network device and the target access network device; and the target access network device sends the packet to the correct radio bearer based on the encapsulation header information of the received packet, thereby resolving a problem that data in the handover process cannot be accurately forwarded when the forwarding tunnel is a tunnel of a session granularity or a group granularity.

Figure 8:
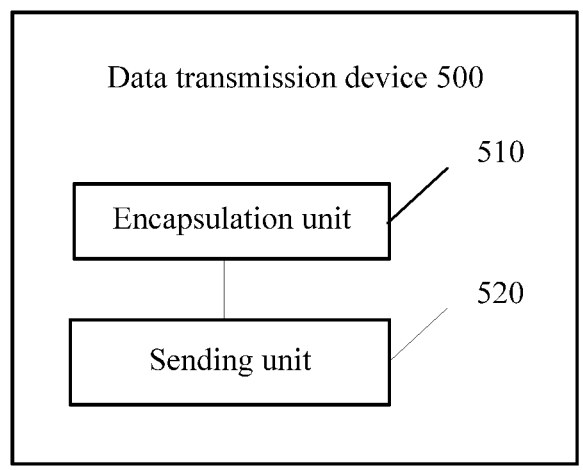
FIG. 8 is a schematic block diagram of a data transmission device according to an embodiment of this application.

FIG. 8 is a schematic block diagram of a data transmission device 500 according to an embodiment of this application. As shown in FIG. 8, the device 500 includes:

an encapsulation unit 510, configured to encapsulate indication information in an encapsulation header of packet data convergence protocol (PDCP) data, where the indication information is used to indicate a radio bearer used for sending the PDCP data by a target access network device; and a sending unit 520, configured to send, to the target access network device, the PDCP data in which the indication information is encapsulated.

Optionally, the indication information includes at least one of the following information: a first radio bearer identifier, a quality of service marking, a quality of service marking and an IP address of a terminal device, a second radio bearer identifier, or a third radio bearer identifier, where the first radio bearer identifier is allocated by a control plane network element, and is used to identify a radio bearer between an access network and the terminal device; the quality of service marking is information in an encapsulation header of a packet transmitted between a core network user plane network element and a source access network, and is used to identify a quality of service requirement of data transmission; the second radio bearer identifier is allocated by the target access network device, and is used to identify a radio bearer between the target access network device and the terminal device; and the third radio bearer identifier is allocated by the source access network device, and is used to identify a radio bearer between the source access network device and the terminal device.

Optionally, the sending unit 520 is configured to:

send the PDCP data to the target access network device through a forwarding tunnel, where the forwarding tunnel is used to transmit one or more service packets of the terminal device.

The encapsulation unit 510 is configured to:

when the forwarding tunnel is a tunnel of a session granularity, encapsulate at least one of the first radio bearer identifier, the quality of service marking, the second radio bearer identifier, and the third radio bearer identifier in the encapsulation header of the PDCP data; or when the forwarding tunnel is a tunnel of a group granularity, encapsulate at least one of the second radio bearer identifier, the third radio bearer identifier, and the quality of service marking and the IP address of the terminal device in the encapsulation header of the PDCP data.

Optionally, before the sending unit 520 sends, to the target access network device, the PDCP data in which the indication information is encapsulated, the device 500 further includes:

a receiving unit 530, configured to receive a handover request acknowledgment message from the target access network device; and a determining unit 540, configured to determine that the second radio bearer identifier is the indication information after the handover request acknowledgment message is received.

Optionally, the handover request acknowledgment message includes: the second radio bearer identifier, a correspondence between the second radio bearer identifier and the third radio bearer identifier, or a correspondence between the second radio bearer identifier and the quality of service marking.

Optionally, the determining unit 540 is configured to:

determine that the second radio bearer identifier is the indication information based on the correspondence between the second radio bearer identifier and the third radio bearer identifier, or the correspondence between the second radio bearer identifier and the quality of service marking.

Optionally, the determining unit 540 is configured to:

when the handover request acknowledgment message includes none of the information: the second radio bearer identifier, the correspondence between the second radio bearer identifier and the third radio bearer identifier, and the correspondence between the second radio bearer identifier and the quality of service marking, determine that the indication information is the third radio bearer identifier.

Optionally, before the sending unit 520 sends, to the target access network device, the PDCP data in which the indication information is encapsulated, the determining unit 540 is further configured to:

determine the radio bearer for sending the PDCP data;

determine, based on a correspondence between the radio bearer and the first radio bearer identifier, that the indication information is the first radio bearer identifier;

determine the quality of service marking for sending the PDCP data, and determine that the indication information is the quality of service marking;

determine the quality of service marking and the IP address of the terminal device that are for sending the PDCP data, and determine that the indication information is the quality of service marking and the IP address of the terminal device; or determine the radio bearer for sending the PDCP data, and determine, based on a correspondence between the radio bearer and the third radio bearer identifier, that the indication information is the third radio bearer identifier.

Optionally, the encapsulation unit 510 is configured to:

encapsulate the indication information in a transport layer protocol encapsulation header of the PDCP data; or encapsulate the indication information in a data link layer protocol encapsulation header of the PDCP data.

Optionally, the sending unit 520 is configured to:

send, to the target access network device by using the core network user plane network element, the PDCP data in which the indication information is encapsulated.

It is understood by one of skill in the art that the foregoing and other operations and/or functions of the various units in the data transmission device 500 in this embodiment of this application are for the purpose of implementing corresponding procedures of the source access network devices in the method 200 shown in FIG. 3, the method 300 shown in FIG. 6, and the method 400 shown in FIG. 7. For brevity, details are not described herein again.

Figure 9:
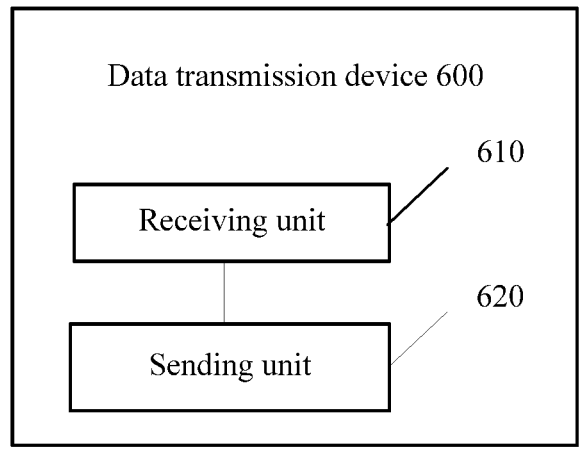
FIG. 9 is a schematic block diagram of a data transmission device according to another embodiment of this application.

FIG. 9 is a schematic block diagram of a data transmission device 600 according to an embodiment of this application. As shown in FIG. 9, the device 600 includes:

a receiving unit 610, configured to receive packet data convergence protocol (PDCP) data from a source access network device, where an encapsulation header of the PDCP data includes indication information, and the indication information is used to indicate a radio bearer used for sending the PDCP data by a target access network device; and a sending unit 620, configured to send the PDCP data to a terminal device on the radio bearer based on the indication information.

Optionally, the indication information includes: a first radio bearer identifier, a quality of service marking, a quality of service marking and an Internet protocol (IP) address of the terminal device, a second radio bearer identifier, or a third radio bearer identifier, where the first radio bearer identifier is allocated by a control plane network element, and is used to identify a radio bearer between an access network and the terminal device; the quality of service marking is information in an encapsulation header of a packet transmitted between a core network user plane network element and a source access network, and is used to identify a quality of service requirement of data transmission; the second radio bearer identifier is allocated by the target access network device, and is used to identify a radio bearer between the target access network device and the terminal device; and the third radio bearer identifier is allocated by the source access network device, and is used to identify a radio bearer between the source access network device and the terminal device.

Optionally, the device 600 further includes: a determining unit 630, configured to: when the indication information includes the first radio bearer identifier, determine that a radio bearer identified by the first radio bearer identifier is the radio bearer used for sending the PDCP data;

when the indication information includes the quality of service marking, determine that a radio bearer corresponding to the quality of service marking is the radio bearer used for sending the PDCP data;

when the indication information includes the quality of service marking and the IP address of the terminal device, determine that a radio bearer corresponding to the quality of service marking and the IP address of the terminal device is the radio bearer used for sending the PDCP data;

when the indication information includes the second radio bearer identifier, determine that a radio bearer identified by the second radio bearer identifier is the radio bearer used for sending the PDCP data; or when the indication information includes the third radio bearer identifier, determine the second radio bearer identifier corresponding to the third radio bearer identifier, and determine that a radio bearer identified by the second radio bearer identifier is the radio bearer used for sending the PDCP data.

Optionally, when the indication information includes the third radio bearer identifier, the device further includes:

a storage unit 640, configured to store a correspondence between the second radio bearer identifier and the third radio bearer identifier.

Optionally, the receiving unit 610 is configured to receive, through a forwarding tunnel, the PDCP data sent by the source access network device, where the forwarding tunnel is used to transmit one or more service packets of the terminal device.

The determining unit 630 is configured to determine that:

when the forwarding tunnel is a tunnel of a session granularity, the indication information includes: the first radio bearer identifier, the quality of service marking, the second radio bearer identifier, or the third radio bearer identifier; or when the forwarding tunnel is a tunnel of a group granularity, the indication information includes: the first radio bearer identifier, the second radio bearer identifier, the third radio bearer identifier; or the quality of service marking and the IP address of the terminal device.

Optionally, before the receiving unit 610 receives the PDCP data sent by the source access network device, the sending unit 620 is configured to send a handover request acknowledgment message to the source access network device, where the handover request acknowledgment message includes: the second radio bearer identifier, the correspondence between the second radio bearer identifier and the third radio bearer identifier, or a correspondence between the second radio bearer identifier and the quality of service marking.

Optionally, the encapsulating indication information in an encapsulation header of PDCP data includes:

encapsulating the indication information in a transport layer protocol encapsulation header of the PDCP data; or encapsulating the indication information in a data link layer protocol encapsulation header of the PDCP data.

Optionally, the receiving unit 610 is configured to:

receive the PDCP data from the source access network device by using the core network user plane network element.

It is understood by one of skill in the art that the foregoing and other operations and/or functions of the various units in the data transmission device 600 in this embodiment of this application are for the purpose of implementing corresponding procedures of the target access network devices in the method 200 shown in FIG. 3, the method 300 shown in FIG. 6, and the method 400 shown in FIG. 7. For brevity, details are not described herein again.

Figure 10:
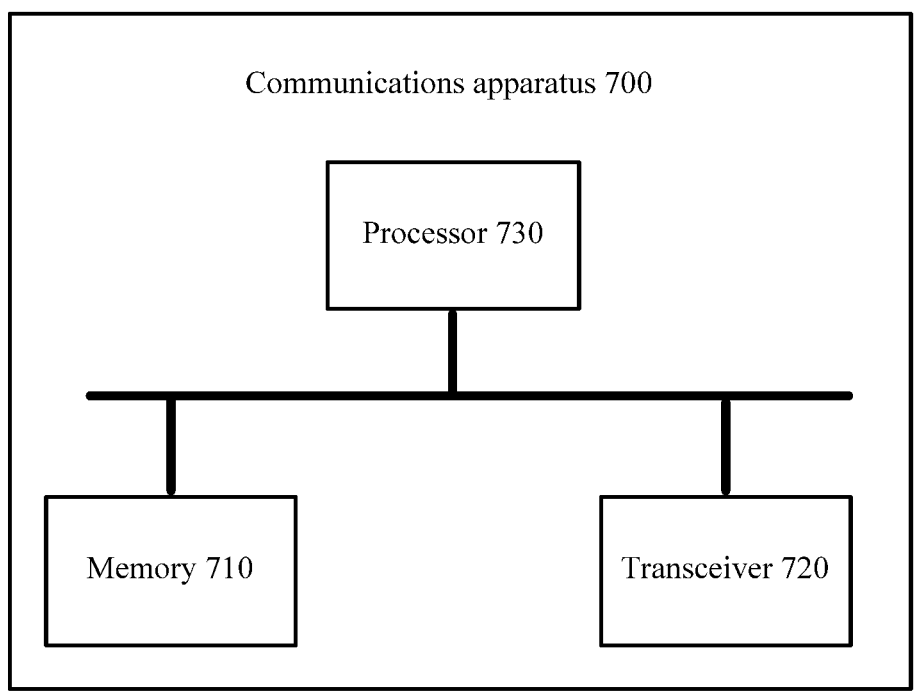
FIG. 10 is a schematic block diagram of a communications device according to an embodiment of this application.

FIG. 10 is a schematic block diagram of a communications device 700 according to an embodiment of this application. The communications apparatus 700 includes:

a memory 710, configured to store a program, where the program includes code;

a transceiver 720, configured to communicate with another device; and a processor 730, configured to execute the program code stored in the memory 710.

Optionally, when the code is executed, the processor 730 may implement the various operations performed by the source access network device in the method 200 shown in FIG. 3, the method 300 shown in FIG. 6, or the method 400 shown in FIG. 7. For brevity, details are not described herein again. In this case, the communications apparatus 700 may be the source access network device. The transceiver 720 is configured to perform specific signal sending and receiving when driven by the processor 730.

Optionally, when the code is executed, the processor 730 may further implement the various operations performed by the target access network device in the method 200 shown in FIG. 3, the method 300 shown in FIG. 6, or the method 400 shown in FIG. 7. For brevity, details are not described herein again. In this case, the communications apparatus 700 may be the target access network device.

It is understood by one of skill in the art that in this embodiment of this application, the processor 730 may be a central processing unit (CPU), or the processor 730 may be another general purpose processor, a digital signal processor (DSP), an application-specific integrated circuit (ASIC), a field programmable gate array (FPGA) or another programmable logic device, a discrete gate or a transistor logic device, a discrete hardware component, or the like. The general purpose processor may be a microprocessor or the processor may be any conventional processor, or the like.

The memory 710 may include a read-only memory and a random access memory, and provides the processor 730 with data and an instruction. A part of the memory 710 may further include a non-volatile random access memory. For example, the memory 710 may further store information about a device type.

The transceiver 720 may be configured to implement a signal sending and receiving function, for example, a frequency modulation and demodulation function, or referred to as an up-conversion and down-conversion function.

During implementation, at least one operation in the foregoing method may be completed by an integrated logical circuit of hardware in the processor 730, or the integrated logical circuit may complete the at least one operation driven by an instruction in a form of software. Therefore, the communications apparatus 700 may be a chip or a chip set. The operations of the method disclosed with reference to the embodiments of this application may be directly performed by a hardware processor, or may be performed by using a combination of hardware in the processor and a software module. The software module may be located in a mature storage medium in the art, such as a random access memory, a flash memory, a read-only memory, a programmable read-only memory or electrically erasable programmable memory, or a register. The storage medium is located in the memory. The processor 730 reads information in the memory and completes the operations of the foregoing methods in combination with hardware of the processor. To avoid repetition, details are not described herein again.

All or some of the foregoing embodiments may be implemented by using software, hardware, firmware, or any combination thereof. When software is used to implement the embodiments, the embodiments may be implemented or partially in a form of a computer program product. The computer program product includes one or more computer instructions. When the computer program instructions are loaded and executed on the computer, the procedures or functions according to the embodiments of the present disclosure are all or partially generated. The computer may be a general-purpose computer, a special-purpose computer, a computer network, or another programmable apparatus. The computer instructions may be stored in a computer-readable storage medium or transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

It is understood by one of skill in the art that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

It is understood by a person skilled in the art that, for the purpose of convenient and brief description, for a detailed working process of the system, apparatus, and unit, refer to a corresponding process in the method embodiments. Details are not described herein again.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data transmission method, comprising:
   encapsulating, by a source access network device, indication information in an encapsulation header of packet data convergence protocol (PDCP) data, wherein the indication information is used to indicate a radio bearer used for sending the PDCP data by a target access network device;
   sending, by the source access network device to the target access network device, the PDCP data in which the indication information is encapsulated, wherein the indication information indicates the radio bearer used by the target access network device to send the PDCP data to a terminal device; and
   wherein the encapsulating, by the source access network device, the indication information comprises:
   determining, by the source access network device, a third radio bearer of a third radio bearer identifier, and the third radio bearer identifier is allocated by the source access network device and is used to identify the third radio bearer which is between the source access network device and the terminal device;
   determining, by the source access network device, that the third radio bearer is to be disconnected and a correspondence between a second radio bearer identifier and the third radio bearer identifier, the second radio bearer identifier is allocated by the target access network device and is used to identify a second radio bearer between the target access network device and the terminal device; and
   encapsulating, by the source access network device, the indication information in the encapsulation header, wherein the indication information comprises the second radio bearer identifier, wherein the PDCP data is obtained by decapsulating, by the source access network device, downlink data or uplink data.

2. The method according to claim 1, wherein the indication information further comprises: a first radio bearer identifier, a quality of service marking, or an Internet protocol address of the terminal device, wherein
   the first radio bearer identifier is allocated by a control plane network element, and is used to identify a first radio bearer between an access network and the terminal device; the quality of service marking is information in an encapsulation header of a packet transmitted between a core network user plane network element and the source access network device, and is used to identify a quality of service requirement of data transmission.

3. The method according to claim 2, wherein the sending, by the source access network device to the target access network device, the PDCP data in which the indication information is encapsulated comprises:
   sending, by the source access network device to the target access network device through a forwarding tunnel, the PDCP data in which the indication information is encapsulated; and
   the encapsulating, by a source access network device, indication information in an encapsulation header of PDCP data comprises:
   when the forwarding tunnel is a tunnel of a session granularity, encapsulating at least one of the first radio bearer identifier, the quality of service marking, the second radio bearer identifier, or the third radio bearer identifier in the encapsulation header of the PDCP data; or
   when the forwarding tunnel is a tunnel of a group granularity, encapsulating at least one of the first radio bearer identifier, the second radio bearer identifier, the third radio bearer identifier, or the quality of service marking and the IP address of the terminal device in the encapsulation header of the PDCP data.

4. The method according to claim 2, further comprising:
   determining, by the source access network device after receiving a handover request acknowledgment message, the indication information, including:
   before sending the PDCP data, determining, by the source access network device after receiving the handover request acknowledgment message, that the second radio bearer identifier is the indication information.

5. The method according to claim 4, wherein the handover request acknowledgment message comprises:
   the second radio bearer identifier, the correspondence between the second radio bearer identifier and the third radio bearer identifier, or a correspondence between the second radio bearer identifier and the quality of service marking.

6. The method according to claim 5, wherein the determining that the second radio bearer identifier is the indication information comprises:
determining, based on the correspondence between the second radio bearer identifier and the third radio bearer identifier, or the correspondence between the second radio bearer identifier and the quality of service marking, that the indication information is the second radio bearer identifier.

7. The method according to claim 2, further comprising:
before sending the PDCP data, determining, by the source access network device, the radio bearer for sending the PDCP data;
before sending the PDCP data, determining, based on a correspondence between the radio bearer and the first radio bearer identifier, that the indication information is the first radio bearer identifier;
before sending the PDCP data, determining, by the source access network device, the quality of service marking for sending the PDCP data, and determining that the indication information is the quality of service marking;
before sending the PDCP data, determining, by the source access network device, the quality of service marking and the IP address of the terminal device that are for sending the PDCP data, and determining that the indication information is the quality of service marking and the IP address of the terminal device; or
before sending the PDCP data, determining, by the source access network device, the radio bearer for sending the PDCP data, and determining, based on a correspondence between the radio bearer and the third radio bearer identifier, that the indication information is the third radio bearer identifier.

8. The method according to claim 1, wherein the encapsulating indication information in an encapsulation header of PDCP data comprises:
encapsulating the indication information in a transport layer protocol encapsulation header of the PDCP data; or
encapsulating the indication information in a data link layer protocol encapsulation header of the PDCP data.

9. The method according to claim 1, wherein the sending the PDCP data in which the indication information is encapsulated comprises:
sending, by the source access network device to the target access network device by using a core network user plane network element, the PDCP data in which the indication information is encapsulated.

10. A communication device, comprising:
one or more processors to cause the communication device to:
encapsulate indication information in an encapsulation header of packet data convergence protocol (PDCP) data, wherein the indication information is used to indicate a radio bearer used for sending the PDCP data by a target access network device;
send, to the target access network device, the PDCP data in which the indication information is encapsulated, wherein the indication information indicates the radio bearer used by the target access network device to send the PDCP data to a terminal device; and
wherein the one or more processors further cause the communication device to:
determine a third radio bearer of a third radio bearer identifier, and the third radio bearer identifier is allocated by a source access network device and is used to identify the third radio bearer which is between the source access network device and the terminal device;
determine that the third radio bearer is to be disconnected and a correspondence between a second radio bearer identifier and the third radio bearer identifier, the second radio bearer identifier is allocated by the target access network device and is used to identify a second radio bearer between the target access network device and the terminal device; and
encapsulate, by the source access network device, the indication information in the encapsulation header, wherein the indication information comprises the second radio bearer identifier, wherein the PDCP data is obtained by decapsulating, by the source access network device, downlink data or uplink data.

11. The communication device according to claim 10, wherein the indication information comprises: a first radio bearer identifier, a quality of service marking, or an Internet protocol address of the terminal device, wherein
the first radio bearer identifier is allocated by a control plane network element, and is used to identify a first radio bearer between an access network and the terminal device; the quality of service marking is information in an encapsulation header of a packet transmitted between a core network user plane network element and the source access network device, and is used to identify a quality of service requirement of data transmission.

12. The communication device according to claim 11, is further to:
send the PDCP data to the target access network device through a forwarding tunnel; and
when the forwarding tunnel is a tunnel of a session granularity, encapsulate at least one of the first radio bearer identifier, the quality of service marking, the second radio bearer identifier, or the third radio bearer identifier in the encapsulation header of the PDCP data; or
when the forwarding tunnel is a tunnel of a group granularity, encapsulate at least one of the second radio bearer identifier, the third radio bearer identifier, or the quality of service marking and the IP address in the encapsulation header of the PDCP data.

13. The communication device according to claim 11, the communication device is further to:
before sending the PDCP data,
determine that the second radio bearer identifier is the indication information.

14. The communication device according to claim 13, further comprising:
before sending the PDCP data, receiving a handover request acknowledgment message from the target access network device, wherein the handover request acknowledgment message comprises:
the second radio bearer identifier, the correspondence between the second radio bearer identifier and the third radio bearer identifier, or a correspondence between the second radio bearer identifier and the quality of service marking.

15. The communication device according to claim 14, is further to:
determine, based on the correspondence between the second radio bearer identifier and the third radio bearer identifier, or the correspondence between the second radio bearer identifier and the quality of service marking, that the indication information is the second radio bearer identifier.

16. The communication device according to claim 11, the communication device is further to:
- before sending the PDCP data, determine the radio bearer for sending the PDCP data;
- before sending the PDCP data, determine, based on a correspondence between the radio bearer and the first radio bearer identifier, that the indication information is the first radio bearer identifier;
- before sending the PDCP data, determine the quality of service marking for sending the PDCP data, and determine that the indication information is the quality of service marking;
- before sending the PDCP data, determine the quality of service marking and the IP address of the terminal device that are for sending the PDCP data, and determine that the indication information is the quality of service marking and the IP address of the terminal device; or
- before sending the PDCP data, determine the radio bearer for sending the PDCP data, and determine, based on a correspondence between the radio bearer and the third radio bearer identifier, that the indication information is the third radio bearer identifier.

17. A non-transitory computer-readable medium storing instructions, which when executed by a processor, cause the processor to perform operations comprising:
- encapsulating, by a source access network device, indication information in an encapsulation header of packet data convergence protocol (PDCP) data, wherein the indication information is used to indicate a radio bearer used for sending the PDCP data by a target access network device;
- sending, by the source access network device to the target access network device, the PDCP data in which the indication information is encapsulated, wherein the indication information indicates the radio bearer used by the target access network device to send the PDCP data to a terminal device; and
- wherein the instructions, when executed by the processor, cause the processor to perform operations:
- determining a third radio bearer of a third radio bearer identifier, and the third radio bearer identifier is allocated by the source access network device and is used to identify the third radio bearer which is between the source access network device and the terminal device;
- determining, by the source access network device, that the third radio bearer is to be disconnected and a correspondence between a second radio bearer identifier and the third radio bearer identifier, the second radio bearer identifier is allocated by the target access network device and is used to identify a second radio bearer between the target access network device and the terminal device; and
- encapsulating the indication information in the encapsulation header, wherein the indication information comprises the second radio bearer identifier, wherein the PDCP data is obtained by decapsulating, by the source access network device, downlink data or uplink data.

18. The non-transitory computer-readable medium according to claim 17, wherein the indication information comprises: a first radio bearer identifier, a quality of service marking, or an Internet protocol address of the terminal device, wherein
- the first radio bearer identifier is allocated by a control plane network element, and is used to identify a first radio bearer between an access network and the terminal device; the quality of service marking is information in an encapsulation header of a packet transmitted between a core network user plane network element and the source access network device, and is used to identify a quality of service requirement of data transmission.

19. The non-transitory computer-readable medium according to claim 18, wherein the sending the PDCP data in which the indication information is encapsulated comprises:
- sending, by the source access network device to the target access network device through a forwarding tunnel, the PDCP data in which the indication information is encapsulated; and
- the encapsulating, by the source access network device, indication information in an encapsulation header of PDCP data comprises:
- when the forwarding tunnel is a tunnel of a session granularity, encapsulating at least one of the first radio bearer identifier, the quality of service marking, the second radio bearer identifier, or the third radio bearer identifier in the encapsulation header of the PDCP data; or
- when the forwarding tunnel is a tunnel of a group granularity, encapsulating at least one of the first radio bearer identifier, the second radio bearer identifier, the third radio bearer identifier, or the quality of service marking and the IP address of the terminal device in the encapsulation header of the PDCP data.

20. The non-transitory computer-readable medium according to claim 18, the operations further comprise:
- before sending the PDCP data, determining, by the source access network device after receiving a handover request acknowledgment message, that the second radio bearer identifier is the indication information.

* * * * *